(12) United States Patent  (10) Patent No.: US 9,317,158 B2
Schwartz et al.  (45) Date of Patent: Apr. 19, 2016

(54) BASELINE MANAGEMENT FOR INPUT DEVICES

(75) Inventors: Adam Schwartz, Redwood City, CA (US); Joseph Kurth Reynolds, Alviso, CA (US); Joel C. Jordan, Sunnyvale, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 870 days.

(21) Appl. No.: 13/414,468

(22) Filed: Mar. 7, 2012

(65) Prior Publication Data

US 2012/0229418 A1  Sep. 13, 2012

Related U.S. Application Data

(60) Provisional application No. 61/450,504, filed on Mar. 8, 2011.

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01)

(58) Field of Classification Search
CPC ....... G06F 3/041; G06F 3/044; G06F 3/0412; G06F 3/0416
See application file for complete search history.

(56) References Cited

U.S. PATENT DOCUMENTS

| | | |
|---|---|---|
| 5,394,003 A | 2/1995 | Bales et al. |
| 6,078,315 A | 6/2000 | Huang |
| 6,323,846 B1 | 11/2001 | Westerman et al. |
| 6,593,917 B2 | 7/2003 | Toda |
| 6,621,341 B1 | 9/2003 | Shifrin |
| 6,741,237 B1 | 5/2004 | Benard et al. |
| 7,187,369 B1 | 3/2007 | Kanbara et al. |
| 7,254,775 B2 | 8/2007 | Geaghan et al. |
| 7,265,746 B2 | 9/2007 | Knowles et al. |
| 7,532,202 B2 | 5/2009 | Roberts |
| 7,567,240 B2 | 7/2009 | Peterson, Jr. et al. |
| 7,855,718 B2 | 12/2010 | Westerman |
| 8,026,904 B2 | 9/2011 | Westerman |
| 8,040,326 B2 | 10/2011 | Hotelling et al. |
| 8,054,296 B2 * | 11/2011 | Land et al. ..................... 345/173 |
| 2008/0006453 A1 | 1/2008 | Hotelling |
| 2008/0047764 A1 | 2/2008 | Lee et al. |
| 2008/0074182 A1 | 3/2008 | Hoelzle et al. |
| 2010/0045635 A1 | 2/2010 | Soo |
| 2010/0127717 A1 | 5/2010 | Cordeiro et al. |
| 2010/0253647 A1 | 10/2010 | Agari et al. |
| 2011/0062974 A1 * | 3/2011 | Day et al. ...................... 324/713 |

(Continued)

*Primary Examiner* — Kenneth B Lee, Jr.
(74) *Attorney, Agent, or Firm* — Patterson + Sheridan, LLP

(57) ABSTRACT

Embodiments of the invention generally provide a method and system that is able to minimize or remove the affect of substantially non-random electrical interference on an input device's ability to reliably and accurately sense the position of an object. In one embodiment, the input device is configured to systematically correct for a cyclic variation in the electromagnetic interference (EMI) generated by components within the electronic system, such as interference generated by the process of refreshing or updating an image on a display module that affects the capacitive sensing measurements acquired from a plurality of capacitive sensing elements. However, in some embodiments of the invention, the performance of an input device is improved by reducing the affect that external interference generated outside of the electronic system have on the position sensing data acquired by the input device.

20 Claims, 9 Drawing Sheets

(56) References Cited

U.S. PATENT DOCUMENTS

| | | |
|---|---|---|
| 2011/0115717 A1* | 5/2011 | Hable et al. .................. 345/173 |
| 2011/0210939 A1 | 9/2011 | Reynolds et al. |
| 2011/0210941 A1 | 9/2011 | Reynolds et al. |
| 2011/0216016 A1 | 9/2011 | Rosener |
| 2011/0216039 A1 | 9/2011 | Chen et al. |
| 2011/0266074 A1 | 11/2011 | Fan et al. |

* cited by examiner

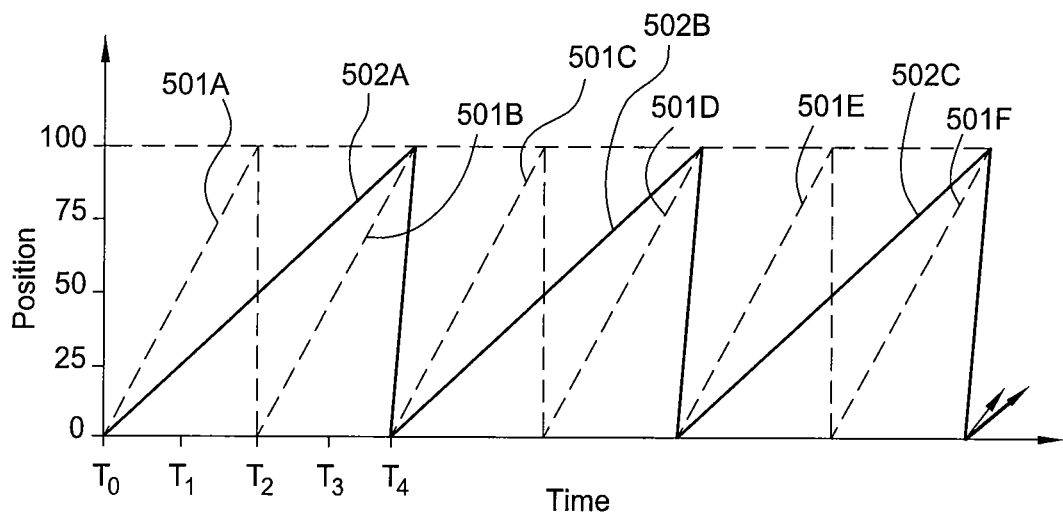
FIG. 5
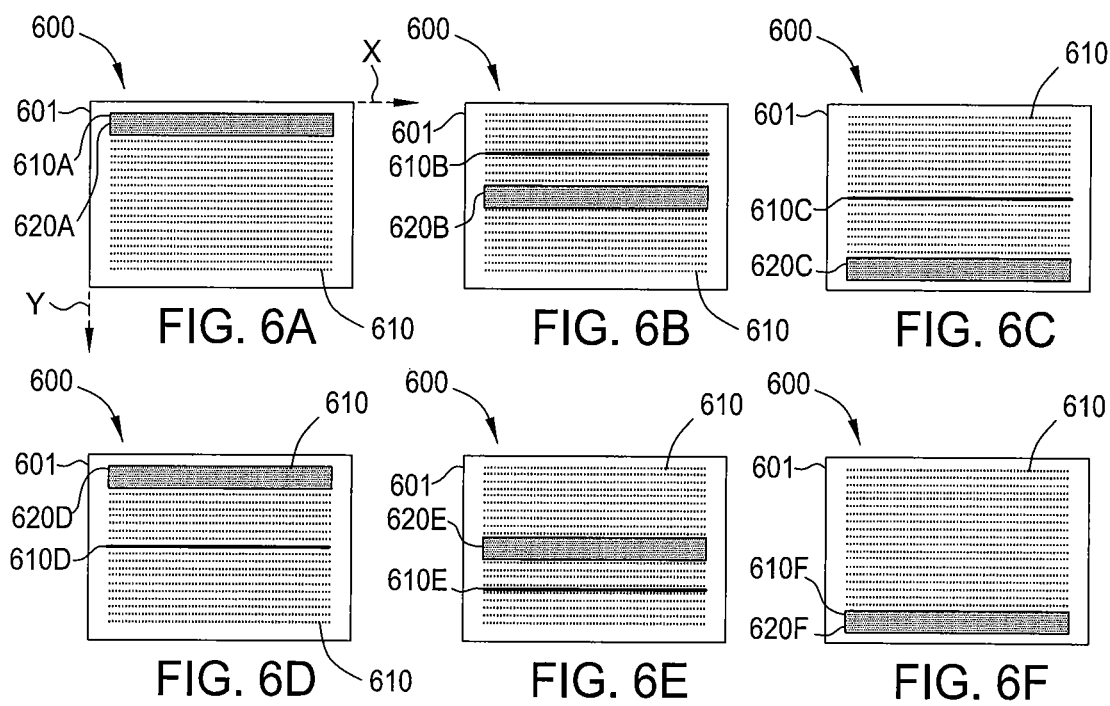
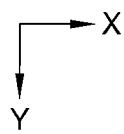

BASELINE MANAGEMENT FOR INPUT DEVICES

CROSS-REFERENCE TO RELATED APPLICATIONS

This application claims benefit of U.S. Provisional Patent Application Ser. No. 61/450,504, filed Mar. 8, 2011, which is herein incorporated by reference.

BACKGROUND OF THE INVENTION

1. Field of the Invention

Embodiments of the present invention generally relate to a system and method of sensing an input object's position over a sensing region of a proximity sensing device.

2. Description of the Related Art

Input devices including proximity sensor devices, also commonly called touchpads or touch sensor devices, are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (e.g., opaque touchpads integrated in, or peripheral to, notebooks or desktop computers). Proximity sensor devices are also often used in smaller computing systems (e.g., touch screens integrated in cellular phones).

Proximity sensor devices are typically used in combination with other supporting components, such as display or input devices found in the electronic or computing system. In some configurations, the proximity sensor devices are coupled to, or placed in close proximity to, these supporting components to provide a desired combined function or to provide a desirable complete device package. Many commercially available proximity sensor devices utilize one or more electrical techniques to determine the presence, location and/or motion of an input object, such as a capacitive or a resistive sensing technique. However, these useful electrical sensing techniques are susceptible to interference, such as electromagnetic interference (EMI), commonly generated by the other supporting components, such as liquid crystal display (LCD) components, that are position near the proximity sensor device. In touch screen type applications, since it is often desirable to have the proximity sensor information processed at a rate higher than the display refresh rate to better track the movement or position of an object, the EMI seen by each of the components in the proximity sensing device will vary at any instant in time, depending on where the display device is in its refresh cycle. The EMI seen by the proximity sensors thus tends to have a cyclical variation that is set by the display refresh rate (e.g., display frame rate) and its relation to the proximity sensing device's sensing rate (e.g., sensing frame rate), and thus is generally not random in nature. Current commercial electronic or computing systems have not been able to effectively minimize this type of EMI, and have commonly resorted to finding ways to minimize the magnitude of the interference by distancing the EMI generating components from the proximity sensing device, adding shielding components to the device package, and/or altering the display processing method, thus making the system more expensive and/or needlessly increasing the size of the complete system package. However, it is a common goal in the consumer and industrial electronics industries to reduce the cost and/or size of the electrical components in the formed electronic device.

Therefore, there is a need for a method and a system that has a proximity sensing device that is insensitive to the substantially non-random interference generated by other supporting components found in a desirably sized electronic system.

SUMMARY OF THE INVENTION

Embodiments of the invention generally provide a method and system that is able to minimize or remove the effect of substantially non-random electrical interference on an input device's ability to reliably and accurately sense the position of an input object. In various embodiments, the substantially non-random electrical interference affects the background capacitance of the sensor device. One or more of the embodiments discussed herein are used to improve the performance of an input device by reducing the affect that the interference has on the position sensing data acquired by the input device.

Embodiments of the present invention may also generally provide a processing system for an input device. The processing system may include a sensor module having sensor circuitry and a determination module. The sensor module is coupled to a plurality of sensor electrodes and configured to acquire a first sensing image and a second sensing image. The determination module is configured to compare the first sensing image to a first baseline image and to compare the second sensing image to a second baseline image, wherein the first sensing image and the first baseline image are of a first frame type and the second sensing image and the second baseline image are of a second frame type, and wherein the first frame type and the second frame type are different. The determination module may be further configured to determine positional information of an input object disposed in a sensing region of the input device based on at least one of the comparison of the first sensing image to the first baseline image or the comparison of the second sensing image to the second baseline image.

Embodiments of the present invention may further provide an input device having a plurality of sensor electrodes configured to sense input objects in a sensing region of the input device, and a processing system coupled to the plurality of sensor electrodes. The processing system is configured to acquire a first sensing image and a second sensing image. The processing system is further configured to compare the first sensing image to a first baseline image that is stored in a first memory location, and compare the second sensing image to a second baseline image that is stored in a second memory location, and wherein the first sensing image and the first baseline image correspond to a first frame type and the second sensing image and the second baseline image correspond to a second frame type, and the first frame type is different from the second frame type.

Embodiments of the present invention may further provide a method of determining positional information of an input object in a sensing region of an input device. The method may include acquiring a first sensing image with a plurality of sensor electrodes disposed in the sensing region of the input device, acquiring a second sensing image with the plurality of sensor electrodes, determining a first delta image by comparing the first sensing image to a first baseline image, and determining a second delta image by comparing the second sensing image to a second baseline image, wherein the first sensing image and the first baseline image correspond to a first frame type and the second sensing image and the second baseline image correspond to a second frame type, and the first frame type is different from the second frame type. The positional information of the input object can then be determined based on at least one of the first delta image and the second delta image.

Embodiments of the present invention may further provide a processing system for an input device having a sensor module having sensor circuitry and a determination module. The processing system may include a sensor module that is coupled to a plurality of sensor electrodes, and configured to acquire a plurality of sensing images, wherein the plurality of sensing images comprise a first sensing image, a second sensing image and a third sensing image. The sensor module is also configured to form a first differential image based on a comparison of the first sensing image with the second sensing image, and form a first normalized image based on a comparison of the first differential image and a third sensing image. The determination module is configured to compare the first normalized image and a baseline image, wherein the first sensing image corresponds to a first frame type and the second sensing image and the third sensing image correspond to second frame type, and the first frame type is different than the second frame type.

Embodiments of the present invention may further provide an input device. The input device may include a plurality of sensor electrodes and a processing system. The sensor electrodes are configured to sense input objects in a sensing region of the input device and are coupled to the a processing system. The processing system is configured to acquire a plurality of sensing images. The processing system is further configured to form a first differential image based on a comparison of a first sensing image and a second sensing image of the plurality of sensing images, and form a first normalized image based on a comparison of a third sensing image of the plurality of sensing images with the first differential image, wherein the first sensing image corresponds to a first frame type and the second sensing image and third sensing image correspond to second frame type, and the first frame type is different than the second frame type.

Embodiments of the present invention may further provide a method of sensing an input object disposed in a sensing region of an input device. The method may include acquiring a plurality of sensing images with a plurality of sensor electrodes disposed in a sensing region of an input device, determining a first differential image based on a comparison of a first sensing image of the plurality of sensing images from a second sensing image of the plurality of sensing images, wherein the first sensing image corresponds to a first frame type and the second sensing image correspond to second frame type, and the first frame type is different than the second frame type, determining a first normalized image based on a comparison of the first differential image and a third sensing image of the plurality of sensing images, and determining positional information of the input object disposed in the sensing region of the input device based on a comparison of a baseline image and the normalized sensing image.

Some embodiments perform a method comprising acquiring a first baseline image, acquiring a second baseline image, acquiring a first capacitive image (that is not the first baseline image), acquiring a second capacitive image (that is not the second baseline image), comparing the first capacitive image to the first baseline image, and comparing the second capacitive image to the second baseline image. The first baseline image and the first capacitive image may be of a first frame type, and the second baseline image and the second capacitive image may be of a second frame type. The comparisons of the first and second capacitive images with the first and second baseline images may produce first and second baselined capacitive images. Some embodiments determine information about input in a sensing region using at least the first and second baselined capacitive images. The information may be positional information. Various embodiments may also acquire, compare, and use a third baseline image and a third capacitive image, a fourth baseline image and a fourth capacitive image, or any other additional numbers of baseline images and capacitive images.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

FIG. 5 illustrates a plurality of display refresh cycles and a plurality of proximity sensor sensing cycles as a function of time, according to one or more of the embodiments described herein.

FIGS. 6A-6F illustrates an example of an integrated touch screen at various instants in time to show the state of the display refresh cycle relative to the proximity sensor sensing updating cycles, according to one or more of the embodiments described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention generally provide a method and system that is able to minimize or remove the effect of substantially non-random electrical interference on an input device's ability to reliably and accurately sense the position of an input object. One or more of the embodiments discussed herein are used to improve the performance of an input device by reducing the affect that the interference has on the position sensing data acquired by the input device. In one embodiment, the input device is configured to systematically correct for a cyclic variation in the electromagnetic interference (EMI) generated by components within the electronic system, such as interference generated by the process of refreshing or updating an image on a display device, or also referred to herein as a display module. However, in some embodiments of the invention, the performance of an input device is improved by reducing the effect that external interference generated outside of the electronic system has on the positional information acquired by the input device.

Figure 1:
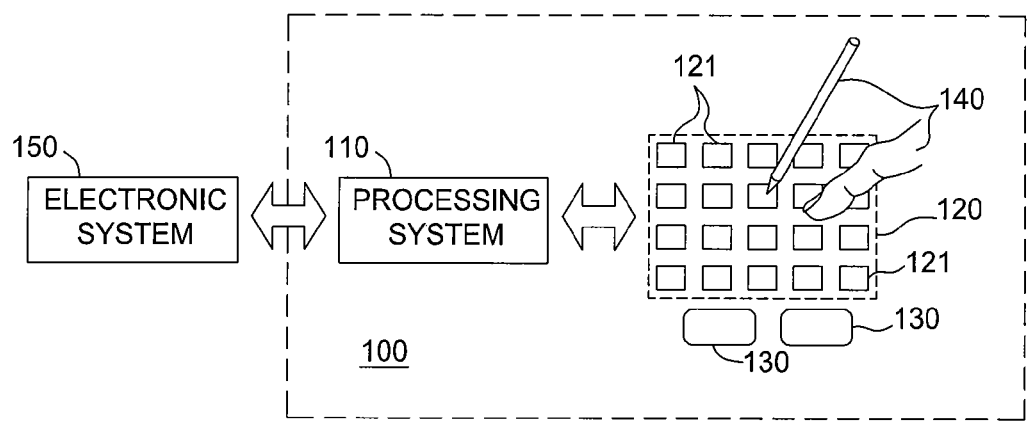
FIG. 1 is a schematic block diagram of an exemplary input device, in accordance with embodiments of the invention.

FIG. 1 is a block diagram of an exemplary input device 100, in accordance with embodiments of the invention. In FIG. 1, the input device 100 is shown as a proximity sensor device (e.g., "touchpad", "touch sensor device") configured to sense inputs provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 generally comprises one or more sensing elements 121 for detecting user input. As several non-limiting examples, the one or more sensing elements 121 in the input device 100 may use capacitive, elastive, resistive, inductive, magnetic acoustic, ultrasonic, and/or optical techniques to detect the position or motion of the input object(s) 140. In some embodiments employing capacitive sensing, absolute capacitance sensing techniques and mutual capacitance sensing techniques may be employed separately or in combination. Some implementations are configured to provide sensing images that span one, two, three, or higher dimensional spaces.

During operation, in one embodiment, the sensing elements 121 within the input device 100 are configured to transmit and receive sensing signals that are used to form a "sensing frame," or "sensing image," that is used to determine the positional information, or lack thereof, of the input object 140 in the sensing region 120 by comparing it with a stored "baseline frame," or "baseline image," to form a "delta frame," "delta image" (i.e., $\Delta F_i$). In some configurations, the input device 100 may be adapted to acquire a set of measurements to form a "capacitive frame" or "sensing frame" representative of the capacitive coupling between transmitter and receiver electrodes (e.g., transcapacitive sensing), and/or between the sensor electrodes to a reference voltage (e.g., absolute sensing). In one embodiment, a "sensing frame" may correspond to a "capacitive image." In another embodiment, a "sensing frame" may correspond to a plurality of "profiles" or measurements along at least one axis of the sensing device. In an effort to avoid confusion with some of the terminology used herein, each of the pairs of terms "sensing frame" and "sensing image", "baseline frame" and "baseline image," and "delta frame" and "delta image" are generally used synonymously, and thus the use of any one of these similar terms in any one place within the application is not intended to limit the disclosure to a particular type or method of detecting the presence of an input object in the sensing region. In one embodiment, a first set of sensing elements 121 are configured to transmit while a second set of sensing elements 121 are configured to receive sensing signals. In another embodiment, a first set of sensing elements 121 are configured to both transmit and receive sensing signals. The sensing image, or sensing frame, comprises data received during a process of measuring or collecting sensor output data (e.g., resulting signals) of at least a portion of the sensing elements 121 distributed across the sensing region 120. The sensor output data may be measured at one instant in time, or by scanning the rows and/or columns of sensing elements distributed across the sensing region 120 in a raster scanning pattern (e.g., serially poling each sensing element separately in a desired scanning pattern), row-by-row scanning pattern, column-by-column scanning pattern or other useful scanning technique. In other embodiments, the sensor data may along each "axis" may be acquired simultaneously or in a scanning fashion. Typically, the rate that the "sensing image" is acquired by the input device 100, or sensing frame rate, is between about 80 and about 180 Hertz (Hz), but can be higher or lower depending on the desired application. A capacitive frame may comprise averaging of multiple, and/or repeated measurements. The baseline image generally comprises a "sensing image" that has been taken at some point in time earlier than the currently received sensing image, which is being compared with it to determine the presence of an input object.

In some applications, the sensing elements 121 in the input device 110 are positioned in close proximity to components internal or external to the input device 110 that provides undesirable interference, such as electromagnetic interference (EMI), that affects the data acquired from the sensing elements 121. The EMI generated by the internal or external components intern affect the acquired "sensing image," which can lead to false detection of the presence, or lack thereof, of the input object 140, create inaccuracies in the positional information that is determined from the sensing images, and/or apparent "bouncing" of an input object between multiple locations in the sensing region 120. As noted above and will be discussed further below, in cases where the EMI is substantially non-random in nature, embodiments of the invention described herein can be used to minimize their affect on the data acquired by the sensing elements 121 found in the input device 100. In some embodiments of the invention, a method for minimizing the effect of the EMI generated by display generating components on the sensing data acquired by the sensing elements 121 is provided.

System Overview

Referring to FIG. 1, in some embodiments of the invention, the input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include input device 100 and separate joysticks or key switches. Further examples of electronic systems 150 include peripherals, such as data input devices (e.g., remote controls and mice) and data output devices (e.g., display screens and printers). Other examples include remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system. As appropriate, the input device 100 may communicate with parts of the electronic system 150 using any one or more of the following: buses, networks, and other wired or wireless interconnections. Examples include $I^2C$, SPI, PS/2, Universal Serial Bus (USB), Bluetooth, RF, and IRDA.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. In some embodiments, the processing system 110 also comprises electronically-readable instructions, such as firmware code, software code, and/or the like. In some embodiments, components composing the processing system 110 are located together, such as near sensing element(s) 121 of the input device 100. In other embodiments, components of processing system 110 are physically separate with one or more components close to sensing element(s) 121 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the input device 100. Each module may comprise circuitry that is a part of the processing system 110, firmware, software, or a combination thereof. In various embodiments, different combinations of modules may be used. In one example, modules include hardware operation modules for operating hardware such as sensor electrodes and display screens, data processing modules for processing data, such as sensor signals, and positional information, and reporting modules for reporting information. In another example, modules include sensor operation modules configured to operate sensing element(s) to detect input, identification modules configured to identify gestures such as mode changing gestures, and mode changing modules for changing operation modes. In one embodiment, the processing system 110 includes a sensor module that is generally used to acquire, or collect, the electrical signals (e.g., sensor data) used to generate the sensing images and perform various calculations to help determine the positional information of an input object in the sensing region 120. In some cases the processing system 100 may further comprise a determination module that is adapted to determine the positional information of an input object, and also manage the baseline images (e.g., correct for drift in the sensing element data).

In some embodiments, the processing system 110 responds to user input (or lack of user input) in the sensing region 120 directly by causing one or more actions. In one example, actions include changing operation modes, as well as GUI actions, such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system process information received from the processing system 110 is used to act on user input, such as to facilitate a full range of actions, including mode changing actions and GUI actions. For example, in some embodiments, the processing system 110 operates the sensing element(s) 121 of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensing elements 121. As another example, the processing system 110 may perform filtering or other signal conditioning. As yet another example, the processing system 110 may subtract or otherwise account for a baseline set of data (e.g., baseline image), such that the information reflects a difference between the acquired electrical signals (e.g., sensing image) and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional"

positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Sensing Device Overview

In general, the position of the input object 140 relative to the sensing region 120 is monitored or sensed by use of one or more sensing elements 121 (FIG. 1) that are positioned to detect its "positional information." In general, the sensing elements 121 may comprise one or more sensor elements that are used to detect the presence (or positional information) of an input object. As discussed above, the one or more sensing elements 121 of the input device 100 may use capacitive, elastive, resistive, inductive, magnetic acoustic, ultrasonic, and/or optical techniques to sense the position of an input object. While the information presented below primarily discuses the operation of an input device 100, which uses capacitive sensing techniques to monitor or determine the position of an input object 140 this configuration is not intended to be limiting as to the scope of the invention described herein, since other sensing techniques may be used.

In one embodiment of the input device 100, the sensing element 121 is a capacitive sensing element that is used to sense the position of the input object(s). A capacitive sensing element utilizes an applied voltage and/or current to create an electric field. Nearby input objects 140, therefore, cause changes in the formed electric field, and produce detectable changes in capacitive coupling that are detected as changes in voltage, current, or the like. Some capacitive implementations utilize arrays or other regular or irregular patterns of capacitive sensing elements to create electric fields that allow an input object's position to be sensed within the sensing region 120. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between one or more sensor elements, or one or more sensor electrodes, and an input object. In various embodiments, an at least partially grounded input object positioned near the sensor electrodes alters the electric field near the sensor electrodes, thus changing the measured capacitive coupling of the sensor electrodes to system ground (e.g., a reference voltage). In one implementation, an absolute capacitance sensing method operates by modulating sensor electrodes with respect to a reference voltage (e.g., system ground), and by detecting the capacitive coupling between the sensor electrodes and the at least partially grounded input object(s).

Some capacitive implementations utilize "mutual capacitance" (or "transcapacitance") sensing methods based on changes in the capacitive coupling between two or more sensor elements (e.g., sensor electrodes). In various embodiments, an input object near the sensor electrodes alters the electric field created between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

Figure 2:
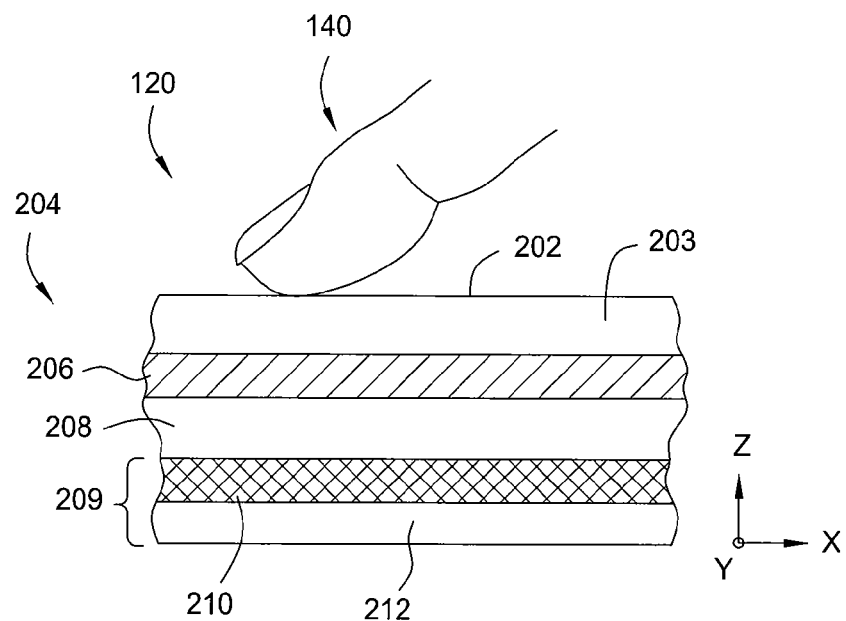
FIG. 2 illustrates a stack-up of a sensor assembly that may be used in the input device to sense the input object, according to one or more of the embodiments described herein.

FIG. 2 is a cross-sectional view of one embodiment of a sensor assembly 204 that can be used in the input device 100 to sense an input object 140 that is within the sensing region 120. The input surface 202 may be provided by a first substrate 203, such as a lens comprising a glass material, that is disposed between the input object 140 and sensor electrode layer(s) 206 of the sensor assembly 204. The sensor element layer(s) 206 may comprise one or more layers that contain an array of sensor electrodes, which are used to sense the positional information of the input object 140. In one configuration of the sensor assembly 204, the second substrate 208 may be a color filter glass that is disposed near or coupled to components that form at least part of a display module 209. In one example, the display module 209 comprises a display element layer 210, such as a layer containing field effect-affected display materials (e.g., liquid crystal (LC), organic light emitting diode (OLED) or other display materials that are affected by an electric field) and a third substrate 212 (e.g., TFT glass). The sensor electrode layer(s) 206, in one configuration, may comprise a single layer that contains transmitter and receiver electrodes that are disposed between the first substrate 203 and a second substrate 208. In another configuration, the sensor electrode layer(s) 206 comprises one or more layers that contain the receiver and transmitter electrodes, a polarizer film layer (not shown) and/or an anti-shatter film layer (not shown) that are disposed between the first substrate 203 and a second substrate 208. In yet another configuration, the sensor electrode layer(s) 206 comprises a first layer (not shown) that contains the receiver electrodes, while the transmitter electrodes are disposed within one of the layers in the display module 209. In yet another configuration, the sensor electrodes in the sensor electrode layer(s) 206 may be disposed within one of the layers that are used to form the display module 209.

Figure 3:
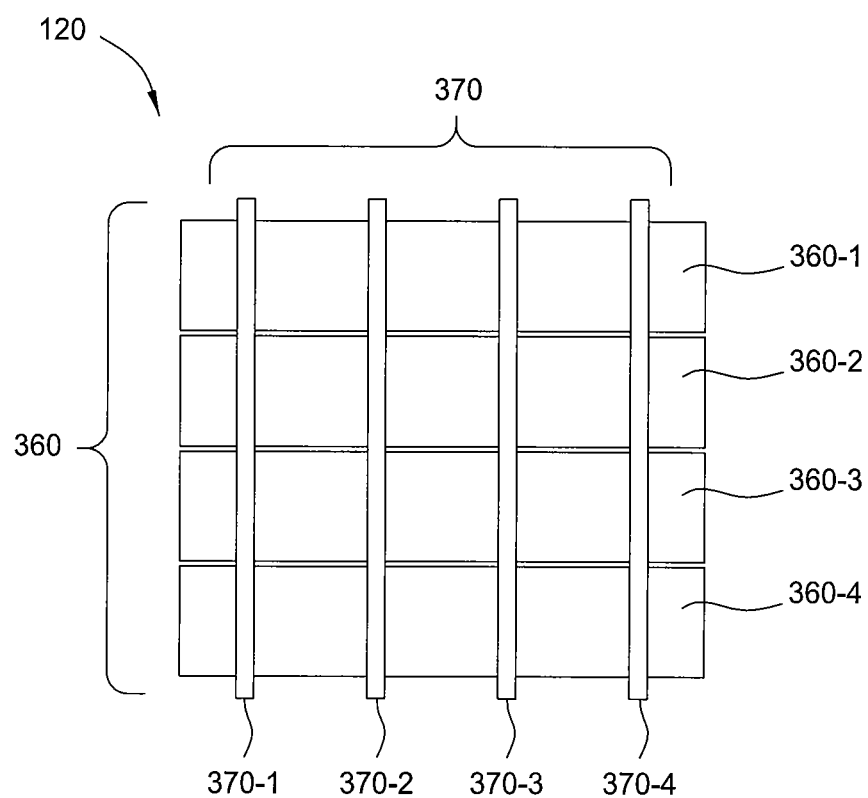
FIG. 3 illustrates a portion of a sensor electrode pattern that may be utilized to generate all or part of the sensing region of an input device, according to one or more of the embodiments described herein.

FIG. 3 is a schematic top view of a portion of the input device 100 that illustrates a portion of a mutual capacitance sensor device having a sensor electrode pattern that may be disposed within the sensor electrode layer(s) 206 and be used to sense the position of an object positioned over the sensing region 120. For clarity of illustration and description, FIG. 3 illustrates a pattern of simple rectangles, and does not show all of the interconnecting features and/or other related components. In one example, as shown, these sensing electrodes are disposed in a sensor electrode pattern that comprises a plurality of transmitter electrodes 360 (e.g., transmitter electrodes 360-1, 360-2, 360-3, etc.) and a plurality of receiver electrodes 370 (e.g., receiver electrodes 370-1, 370-2, 370-3, etc.), which are disposed above, below or adjacent to the plurality of transmitter electrodes 360.

Transmitter electrodes 360 and receiver electrodes 370 are typically ohmically isolated from each other. That is, one or more insulators separate transmitter electrodes 360 and receiver electrodes 370 and prevent them from electrically shorting to each other. In some embodiments, transmitter electrodes 360 and receiver electrodes 370 are separated by electrically insulative material disposed between them at cross-over areas. In such configurations, the transmitter electrodes 360 and/or receiver electrodes 370 may be formed with jumpers connecting different portions of the same electrode. In some embodiments, transmitter electrodes 360 and receiver electrodes 370 are separated by one or more layers of electrically insulative material. In some other embodiments, transmitter electrodes 360 and receiver electrodes 370 are separated by one or more substrates, for example, they may be disposed on opposite sides of the same substrate (e.g., color filter glass), or on different substrates that are laminated together. In yet other embodiments, the transmitter electrodes 360 and receiver electrodes 370 are disposed in a similar layer on a first side of a substrate.

The areas of localized capacitive coupling between transmitter electrodes 360 and receiver electrodes 370 may be termed "capacitive pixels." The capacitive coupling between the transmitter electrodes 360 and receiver electrodes 370 change with the proximity and motion of input objects in the sensing region associated with the transmitter electrodes 360 and receiver electrodes 370.

In some embodiments, the sensor pattern is "scanned" to determine these capacitive couplings. That is, the transmitter electrodes 360 are driven to transmit transmitter signals. The input device 100 may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 370 to be independently determined. The receiver sensor electrodes 370 may be operated singly or multiply to acquire resulting signals. The resulting signals may be used to determine measurements of the capacitive couplings at the capacitive pixels, which are used to determine whether an input object is present and its positional information, as discussed above.

In some touch screen embodiments, the transmitter electrodes 360 and/or the receiver electrodes 370 are disposed on a substrate of the associated display screen. For example, the transmitter electrodes 360 and/or the receiver electrodes 370 may be disposed on a polarizer, a color filter substrate (reference numeral 208 in FIG. 2), or a glass sheet of an LCD. As a specific example, the transmitter electrodes 360 may be disposed on a TFT (Thin Film Transistor) substrate (reference numeral 212 in FIG. 2) of an LCD, and may or may not also be used in display operations of the display screen. As another example, the receiver electrodes 370 may be disposed on a color filter substrate (reference numeral 208 in FIG. 2), on an LCD glass sheet, on a protection material disposed in the LCD glass sheet, on a lens glass (reference numeral 203 in FIG. 2), and the like.

Figure 4:
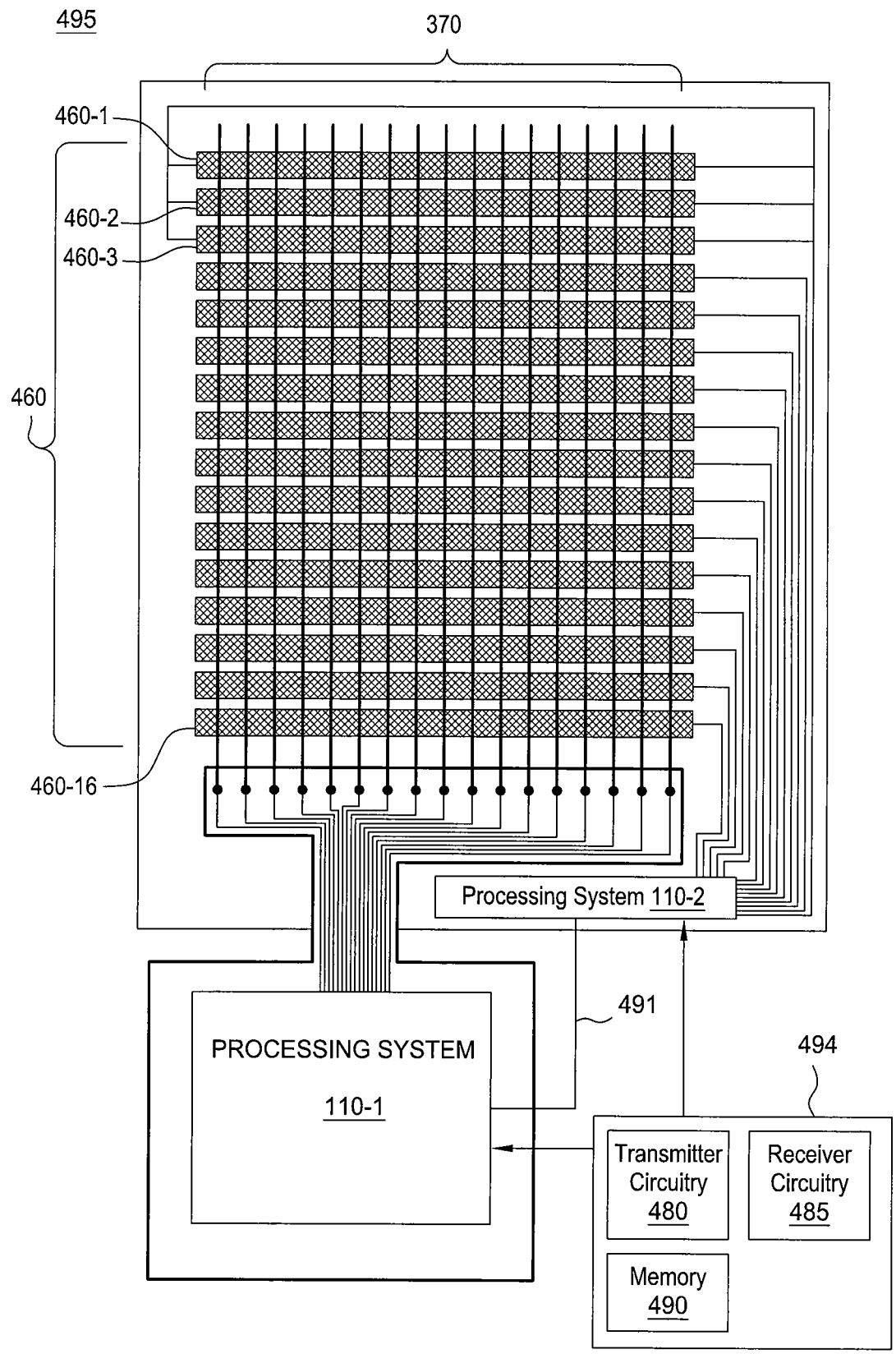
FIG. 4 is a schematic diagram illustrating one example of an input device, according to one or more of the embodiments described herein.

In some touch screen embodiments, as shown in FIG. 4, transmitter electrodes 360 comprise one or more common electrodes (e.g., "V-com electrode"), hereafter common electrodes 460, used in updating the display of the display screen. These common electrodes (e.g., reference numerals 460-1, 460-2, 460-3, . . . 460-16 shown in FIG. 4) may be disposed on an appropriate display screen substrate. For example, the common electrodes may be disposed on the TFT glass in some display screens (e.g., In Plan Switching (IPS) or Plan to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each transmitter electrode 360 comprises one or more common electrodes 460.

FIG. 4 illustrates an input device 495 comprising electrodes 460, receiver electrodes 370, a processing system 110 having two separate ICs (e.g., processing system IC 110-1 and processing system IC 110-2), and a synchronization mechanism 491. The input device 495 may be formed as part of a larger input device 100, which is discussed above. The processing system IC 110-1 and processing system IC 110-2 in the processing system 110 may form part of a sensor module 851 (FIGS. 8-11) and/or part of a determination module 855 (FIGS. 8-11), which are discussed further below.

In FIG. 4, processing system IC 110-1 is coupled with receiver electrodes 370 and configured to receive resulting signals from receiver electrodes 370. Processing system IC 110-2 is coupled with combination electrodes 460, and comprises display circuitry (not shown) configured for displaying images on the display screen. The display circuitry is configured to apply one or more pixel voltage(s) to the display pixel electrodes through pixel source drivers (not shown). The display circuitry is also configured to apply one or more common drive voltage(s) to the combination electrodes 460, and operate them as common electrodes of the display screen. In some embodiments (e.g., line inversion embodiments), the display circuitry is also configured to invert the common drive voltage in synchronization with a drive cycle of the image display. The processing system IC 110-2 is also configured to operate combination electrodes 460 as transmitter electrodes for capacitive sensing.

While the processing system illustrated in FIG. 4 comprises two ICs, the processing system may be implemented with more or less ICs to control the various components in the input device. For example, the functions of the processing system IC 110-1 and the processing system IC 110-2 may be implemented in one integrated circuit that can control the display module elements (e.g., combination electrodes 460) and drive transmitter signals and/or receiver resulting signals transmitted with and/or received from the sensing elements 121 (FIG. 1), which may comprise the receiver electrodes 370 and combination electrodes 460. In some configurations, the processing system may comprise transmitter circuitry, receiver circuitry, and memory. In one example, the processing system comprises transmitter circuitry 480, receiver circuitry 485, and memory 490 that that are disposed within a control circuit 494 that is disposed within one or any number of ICs found in the processing system, depending to the desired processing architecture. In cases where there are more than one processing system ICs, synchronization between separate processing system ICs 110-1, 110-2 may be achieved by communicating between these systems using a synchronization mechanism 491. For example, the synchronization mechanism 491 may synchronize display updating cycle and capacitive sensing cycle by providing a synchronized clock, information about display update state, information about the capacitive sensing state, direction to display update circuitry to update (or not to update), direction to capacitive sensing circuitry to sense (or not to sense), and/or the like. As will be discussed further below, it is desirable to synchronize the creation of a sensing image with the periodic and/or cyclic variation of the generated substantially non-random interference so that its effects can be minimized. The process of synchronizing the components that are controlling the generation of the substantially non-random interference (e.g., display module) and the components that are controlling the creation of the sensing images (e.g., processing system ICs 110-1-2, sensor module 851 (FIGS. 8-11)) may include sending periodic communications between these various components.

In various embodiments, the common electrodes 460 transmit signals for display updating and capacitive sensing in the same time period, or in different time periods. For example, the common electrodes may transmit signals for display updating during a display-update time of a row update cycle, and transmit signals for capacitive sensing during a non-display time of the row update cycle (e.g. sometimes called "horizontal blanking time"). In another example, the common electrodes may transmit signals for display updating during a display-update time of a row update cycle, and transmit signals for capacitive sensing during a multiple combined non-display times of the row update cycles (e.g., sometimes called "long horizontal blanking time" or "in-frame blanking time"). As another example, the common electrodes may transmit signals for display updating during row update cycles with actual display row updates, and transmit signals for capacitive sensing during extra "row update cycles" without actual display row updates (e.g., the non-display times between updating sections of frames or entire frames, sometimes called "vertical blanking time."). Further, in various embodiments, the common electrodes may transit signals for capacitive sensing during any combination of the above non-display times. As a further example, the common electrodes may transmit signals simultaneously for display updating and capacitive sensing, but separate them spatially. As yet another example, the common electrodes may use the same transmission for both display updating and capacitive sensing.

In some touch screen embodiments, other components may also be shared in addition to, or in place of, the common electrodes. For example, one processing system may be used to perform both capacitive sensing and display updating functions.

The control circuitry 494 in the processing system, which may be contained within or distributed between the one or more of the processing system ICs 110-1, 110-2, such as processing system IC 110-1 or 110-2 shown in FIG. 4, comprises transmitter circuitry 480, receiver circuitry 485, and memory 490. Transmitter circuitry 480 operates to transmit transmitter signals with one or more transmitter electrodes of (which may be combination electrodes) that are configured for capacitive sensing. Transmitter circuitry 480 may be configured to operate the transmitter electrodes in any appropriate manner, including those described herein. For example, transmitter circuitry 480 may be configured to drive transmitter electrodes to transmit transmitter signals, to hold the transmitter electrodes to a reference voltage (e.g., to a V-com voltage, to system ground, etc.), or to hold the transmitter electrodes at high impedance.

Receiver circuitry 485 is configured to operate receiver electrodes to receive the resulting signals. In some configurations, the receiver circuitry 485 is adapted to acquire and/or receive resulting signals when no transmitter signal is transmitted from the transmitting circuitry 480, to help determine the amount of environmental interference.

Memory 490 is configured to store one or more baseline images and/or sensing images, and other useful data acquired by the sensor electrodes. Baseline images and/or sensing images may be stored in whatever format appropriate. For example, a baseline image may be stored as differences from a reference (e.g., another baseline image), be scaled, be encoded, be compressed, or other desirable technique. One will note that each sensing image and baseline image generally each comprise matrices of data that include data acquired by each of the sensing elements serially over one scanned cycle of sensing data or all taken at one point in time.

A sensor module 851 (FIGS. 8-11), which as noted above, is generally used to acquire the sensor data (e.g., receive resulting signals) and perform various calculations to help determine the positional information of an input object, and may contain the control circuitry 494, receiver circuitry 485 and at least a portion of the memory 490. The determination module 855 (FIGS. 8-11), which is generally adapted to determine the positional information of an input object by comparing different types of sensing images with an appropriate differential image and/or baseline image to produce an interference free delta image. In some embodiments, the determination module 855 comprises a baselining module that is configured to compare different types of sensing images with the appropriate baseline images to form delta images that are then delivered to and further processed within other parts of the processing system or elsewhere. The approach of having a sensing module and a determination module can be used to separate the baselining and image processing functions, such that the image processing functions can be configured independent of the specifics of the baselining needed (e.g., numbers and sequences of frame types, storing baseline images, updating baseline images, etc.).

Device Operation

During operation, at least a portion of the sensing electrodes within the input device 100 (receiver electrodes 370) are configured to receive resulting signals to form a "sensing image" that is used to determine the presence (e.g., positional information), or lack thereof, of the input object 140 in the sensing region 120. As noted above, multiple sensing images may be acquired over multiple time periods, and differences between them used to derive information about the input object. In some configurations, the input device 100 may be adapted to acquire a set of measurements from the capacitive pixels to form a capacitive type sensing image, or "capacitive image" (also "capacitive frame") representative of the capacitive coupling between transmitter and receiver electrodes (e.g., transcapacitive). Therefore, in one example, successive capacitive images that are acquired over successive periods of time can be used to track the motion(s) of one or more input objects entering, exiting, and within the sensing region 120.

The background capacitance of a sensor device is the capacitive image associated with no input object in the sensing region. The background capacitance generally changes with the environment and operating conditions, and may be estimated in various ways. For example, as noted above, some embodiments take "baseline images" when no input object is determined to be in the sensing region 120, and use those baseline images as estimates of their background capacitances. The baseline images are thus used to help account for any variations between the sensing elements 121. These acquired baseline images can be adjusted for changes in the measured background capacitance of the sensing elements 121 (e.g., transmitter electrodes 360 and receiver electrodes 370) over time, as will be discussed further below. Some embodiments accomplish this by forming a new baseline image and then comparing the new baseline image with an older baseline image to determine the drift in the sensing elements' measurements. In one embodiment, the background capacitance is affected by substantially non-random electrical interference, where the substantially non-random electrical interference is due to a display device and/or any other nearby type of interference generating device.

However, as discussed above, in some applications, the sensing elements 121 in the input device 110 are positioned in close proximity to components internal or external to the input device 110 that provide undesirable interference that affects the data acquired from the sensing elements 121. The interference, such as EMI generated by these internal or external components intern affect the acquired "sensing image," or "capacitive image" as the case may be, which can lead to false detection of the presence, or lack thereof, of an input object 140 when it is compared with a stored baseline image, create inaccuracies in positional information that is determined from the capacitive images, and create apparent "bouncing", or "jitter," of an input object between multiple locations in the sensing region 120. In cases where the EMI is substantially non-random in nature, embodiments of the invention described herein can be used to minimize their affect on the data acquired by the sensing elements 121 found in the input device 100, as will be discussed further below. One will note that the cause and effect of the substantially non-random interference created by the internal or external components on the acquired sensing image data is fundamentally different from the previously discussed drift in each of the sensing element 121's performance over time.

One common form of interference that can affect the data acquired by the sensing elements 121 is electrical interference generated by the various electrical components found in a display module (e.g., LED, OLED, CRT, LCD, EL, or other types of displays) that is disposed in close proximity to the sensing elements 121. In various embodiments, display modules are configured to refresh the display region at a rate of between about 50 and about 80 Hz, which is commonly referred to herein as the "display frame rate." In other embodiments, the "display frame rate" may be below 50 Hz and above 80 Hz. Since it is desirable to reliably and accurately track the movement of the input objects across the input region 120, it is common for the sensing image collection rate, or sensing image frame rate, to be greater than the display frame rate. As noted above, the rate that the "sensing image" is acquired by the input device 100 may be between about 60 and about 180 Hertz (Hz), but can be higher or lower depending on the desired application. Due to the differing frame rates for collecting information from the sensing elements and refreshing the display, the EMI seen by the sensing elements 121 thus tends to have a periodic and/or a cyclic variation.

FIG. 5 schematically illustrates a plurality of display update cycles 502A-502C, or display image refresh cycles, and a plurality of sensing image data collection cycles 501A-501F over a period of time, according to one or more of the embodiments described herein. The Y-axis in FIG. 5 represents the percent completion of each scan through all of the sensing elements 121 used to form each sensing image, and the percent completion of a scan that is used to update a display module. The X-axis in FIG. 5 represents time, and as shown, includes an amount of time that is required to complete three display frame update cycles 502A-502C and six sensing cycles 501A-501F, which are used to form six sensing images worth of data. Thus, in the example shown in FIG. 5, the display frame rate is about half of the sensing image frame rate, such a 60 Hz display refresh rate and a 120 Hz sensing image frame rate. However, in other embodiments other frame rates may be used.

FIGS. 6A-6F is a plan view of a display surface and sensing region of an integrated touch screen device 600, to help graphically illustrate an example of how a display module's display frame update interacts with the collection of sensing images. The touch screen device 600 includes an input device (e.g., input device 100) that is coupled to, or positioned near or over, a display screen 601 of a display module. Each of the FIGS. 6A-6F represents a plot of an instant in time showing the progress of a display update cycle and the status of scans of the sensing elements as they occur in parallel over a single update cycle of the display module. In this touch screen device example, the light gray, horizontal lines 610 in the display screens 601 represent common electrodes (e.g., V-com electrodes), discussed above, that are being used for both display updating and capacitive sensing. The bold black horizontal lines 610A-F represent the common electrodes that are transmitting information to a desired portion of the display screen at that instant in time. The gray rectangles 620A-F represent pluralities of common electrodes that are being poled during that instant in time by the processing system. In one configuration, as illustrated in FIGS. 6A-6F, the pluralities of common electrodes in each row represented by a single gray rectangle 620A-F are driven together to produce larger effective transmitter electrodes. The example illustrated in FIGS. 6A-6F gathers the sensing images in a "raster scan" type way. That is, the sensing image is captured line-by-line, from top to bottom. However, other embodiments may scan the capacitive images in other ways, including scanning from the middle outwards, scanning non-adjacent sections in order, or other desirable scanning technique. Similarly, the displays device as discussed herein uses a raster scanning type process, while other embodiments may scan the display in other ways.

As shown in FIGS. 5 and 6A, at the start of a display image and a sensing image generating cycle, or at time zero (i.e., $T_0$ in FIG. 5), the common electrode(s) 610A are transmitting information to the top most portion of display screen at that instant in time, and the common electrodes at the gray rectangle 620A are transmitting transmitter signals that are acquired by the receiver electrodes (e.g., electrodes 370 in FIG. 4) that are being poled during that instant in time by the processing system. Next, as shown in FIGS. 5 and 6B, at some time later, or time $T_1$, the common electrode(s) 610B are transmitting information to a portion of display screen that is about a quarter of the way through the display update cycle, and the common electrodes at the gray rectangle 620B, which are positioned at the center of the sensing region, are transmitting information to the receiver electrodes. Next, as shown in FIGS. 5 and 6C, at time $T_2$, the common electrodes 610C are transmitting information to a portion of display screen that is about a half of the way through the display update cycle, and the common electrodes at the gray rectangle 620C are transmitting transmitter signals from the common electrodes positioned at the bottom of the sensing region to the receiver electrodes. FIG. 6D illustrates an instant in time, which is just after time $T_2$, where the common electrodes at the gray rectangle 620D are transmitting signal information from the common electrodes at the top of the sensing region and the common electrode(s) 610D, which may be the same as 610C, are transmitting information to a portion of display screen that is about a half of the way through the display update cycle. Next, as shown in FIGS. 5 and 6E, at time $T_3$, the common electrode(s) 610E are transmitting information to a portion of display screen that is about three quarters of the way through the display update cycle, and the common electrodes at the gray rectangle 620E are transmitting transmitter signals again from the center of the sensing region. Finally, as shown in FIGS. 5 and 6F, at time $T_4$, the common electrode(s) 610F are transmitting information to a portion of display screen that is at the bottom of the display unit, and the common electrodes at the gray rectangle 620F are transmitting transmitter signals again from a common electrode positioned at the bottom of the sensing region. Therefore, in this example, the first sensing image acquired over the period of time extending between time $T_0$ and time $T_2$ will experience interference created by the display screen update performed between the top of the display screen to the middle of the display screen, while the second sensing image acquired from time $T_2$ and time $T_4$ will experience interference created by the display screen update performed between the middle of the display screen to the bottom of the display screen. Therefore, the first and second sensing image frames will be different due to the difference in the characteristics of the interference created during the collection of each of the sensing images.

One will note that in some configurations of the touch sensing device, illustrated in FIGS. 6A-6F, may drive the common electrodes to perform capacitive sensing and then drive the common electrodes at a different time to update the display frame. With such an approach, the non-display updating time, when at least one capacitive frame is obtained, may be matched to part or all of the non-display updating times that are typically used to keep display line update rates substantially the same between different display frame rates (e.g. "vertical blanking lines"). In other embodiments, the non-display updating time, when at least one capacitive frame is obtained, may be matched to part or all of the non-display times that occur at the end of row update cycle or to a non-display update time corresponding to multiple row update cycles (e.g., "horizontal blanking time", "long horizontal blanking time", or "in-frame blanking time").

Figure 7:
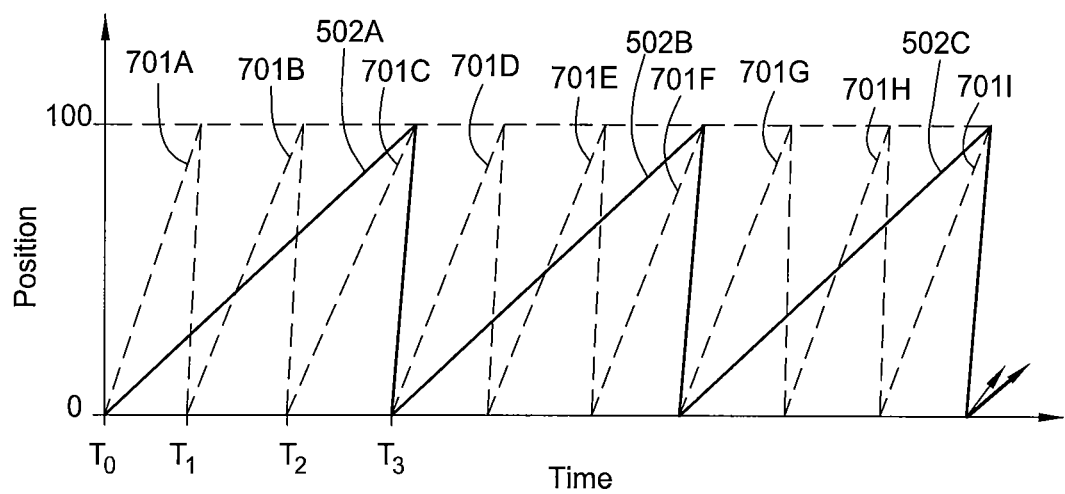
FIG. 7 illustrates a plurality of display refresh cycles and a plurality of proximity sensor sensing cycles as a function of time according to one or more of the embodiments described herein.

While FIGS. 5 and 6A-6F illustrate a configuration in which the sensing image frame rate is twice as fast as the display frame rate, this configuration is not intended to be limiting as to the scope of the invention described herein. In some configurations, the ratio of sensing image frame rate (S) to the display frame rate (R) is defined as a "frame rate ratio" S:R. In general, the frame rate ratio can vary from a number less than one to a number greater than one, however, as noted above, the frame rate ratio is typically greater than one, since the display refresh rates are usually limited by hardware or industry standards, and it is commonly desirable to use a high sensing image frame rate to adequately capture the motion of an input object across a portion of the sensing region 120. In one example, as shown in FIGS. 5 and 6A-6F, the frame rate ratio is equal to about 2. In another example, as illustrated in FIG. 7, a touch screen device may have a frame rate ratio of 3, where in this case the sensing image frame rate may be 180 Hz and the display frame rate is 60 Hz. One will note that the frame rate ratio S:R need not be integer multiples of each other, and thus the frame rate ratio may comprise any rational number so that the variation in the sensing image created by the generated interference can be corrected for due to its repeatable, periodic and/or cyclically varying effect on the generated sensing images. As an example, the frame rate ratio may also include ratios of 3:2, 5:3 and 5:4 (e.g., ratios of 90 Hz/60 Hz, 100 Hz/60 Hz, 100 Hz/80 Hz, respectively).

Similar to the discussion above relating to FIG. 5, in the example illustrated in FIG. 7, the first sensing image 701A acquired over the period of time extending between time $T_0$ and time $T_1$ will experience interference created by the display screen update performed between the top of the display screen to the first third of the display screen, the second sensing image 701B acquired from time $T_1$ and time $T_2$ will experience interference created by the display screen update performed between the first third of the display screen to the second third of the display screen, and the third sensing image 701C acquired from time $T_2$ and time $T_3$ will experience interference created by the display screen update performed between the second third of the display screen to the bottom of the display screen. Therefore, the first, second and third sensing images will each be different due to the difference in the characteristics of interference generated during the collection of each of the sensing images.

The difference in the acquired sensing images are commonly referred to herein as different "frame types," since all of the sensing images acquired during the same portion of display frame update (e.g., times $T_0$ and $T_1$ in FIG. 5), or more generally during the same part of the cycle of generated interference, will have a similar shift or bias in the measurements made by the sensing elements 121. Or said another way, a particular frame type is associated with a mapping of a particular sensing element sensing sequence with a particular display updating sequence. The difference between different frame types generally increase or are more likely, where the sensing elements and display updating electrodes are closer to each other, or when they share components (e.g. combination electrodes). In one example, as shown in FIG. 5, the sensing images 501A, 501C and 501E are of a first frame type and the sensing images 501B, 501D and 501F are of a second frame type, due their same position within the display image update cycle. In yet another example, as shown in FIG. 7, the sensing images 701A, 701D and 701G are of a first frame type, the sensing images 701B, 701E and 701H are of a second frame type and the sensing images 701C, 701F and 701I are of a third frame type. One will note that the frame rate ratio can be useful to help one define the number of different frame types that will be formed due to the presence of the periodic or cyclic interference. In general, the number of different frame types will be the least common multiple of the frame rate ratio. For example, as shown in FIG. 7, a display frame ratio of 3:1 will have three different frame types. As another example, a frame rate ratio of 5:3 (e.g.,5 capacitive sensing frames are acquired while 3 display frames are updated) will create 15 different frame types.

Therefore, the differences between the sensing image frames that are of a different frame type will create problems with more conventional input object detection processes that compare each sensing image with a single baseline image. In a touch screen configuration, having two different frame types, in which the first frame type may be biased in a first way and the second frame type may be biased in a second way, these consistent biases may show up as consistent biases in the determination of the positional information of an input object. Such consistent biases that alternate with the sensing images may create errors in the positional information. For example, the consistent biases that alternate with the sensing images may cause the determined positional information of an input object to jump between two or more regions depending on the number of frame types, even when the actual input object is not moving in the sensing region. Therefore, the various embodiments further discussed below are adapted to correct for this cyclic variation interference seen during the collection of the individual sensor data used to form the sensing images.

Sensing Systems and Methods

To address the issue of the differences created between different sensing image frames created by the substantially non-random interference can be resolved using one or more of the embodiments discussed herein and discussed further below.

Multiple Baseline Correction Method

One system and method of resolving the differences created by the substantially non-random interference's effect on different sensing image frames is to actively use baseline images of each frame type to correct each subsequently acquired sensing image associated with the same frame type. Therefore, in one embodiment, a touch sensing method includes comparing baseline images and acquired sensing images of the same frame type to determine the presence, or lack thereof, of an input object in the sensing region 120. Therefore, by only comparing the baseline images and sensing images of the same type, the effect of the generated substantially non-random interference can be systematically removed.

In one embodiment, to reliably control or manage the process of determining the positional information of an input object, the substantially non-random interference (e.g., display update interference) and sensing image collection processes is synchronized. If the sensing images and substantially non-random interference are not synchronized then the stored baseline images may not adequately correct for the substantially non-random interference, since sensing images can be formed at varying times within the substantially non-random interference cycle due to when the device "wakes up" after a period of nonuse, or the sensing images and substantially non-random interference may drift apart due to the variations in the clocks controlling the collection of the sensing images and the device that generates the substantially non-random interference (e.g., display updating clock). In one configuration, a synchronization mechanism 491 (FIG. 4) is used to synchronize the components that are driving the creation of a sensing image and the components that are driving the updates of a display module by transmitting synchronization signals between these devices.

Therefore, some embodiments of the invention collect and store a baseline image for each of the different frame types, which are then used to detect a touch. Therefore, the process of determining the positional information of input object can be completed by comparing each sensing image of a certain frame type with a baseline image of that same frame type. Mathematically, this could be expressed as:

$$\Delta F_i = F_{i\text{-}k} - B_k \qquad (1),$$

where $\Delta F_i$, or delta image, is the difference between the current sensing image $F_{i\text{-}k}$ and the baseline image $B_k$, where "k" corresponds to the frame-type associated with measurement i. One will note that "i" is an integer that relates to the position of the acquired sensing image in a series of acquired sensing images, and "k" is a label that relates to each particular frame type.

In one example, in the case where the frame rate ratio is equal to 2, as illustrated in FIG. 5, the input system 100 would utilize two baseline images, such as an "odd" and an "even" baseline image, to correct for the substantially non-random interference created by an internal or external device (e.g., display module). In this case, components within the input system 100 will perform one of the following mathematical operations to determine the presence of an input object:

$$\Delta F_i = F_{i\text{-}1} - B_1 = F_{i\text{-}odd} - B_{odd} \text{ for } i=1, 3, 5 \qquad (2), \text{ or}$$

$$\Delta F_i = F_{i\text{-}2} - B_2 = F_{i\text{-}even} - B_{even} \text{ for } i=2, 4, 6 \qquad (3).$$

Figure 8:
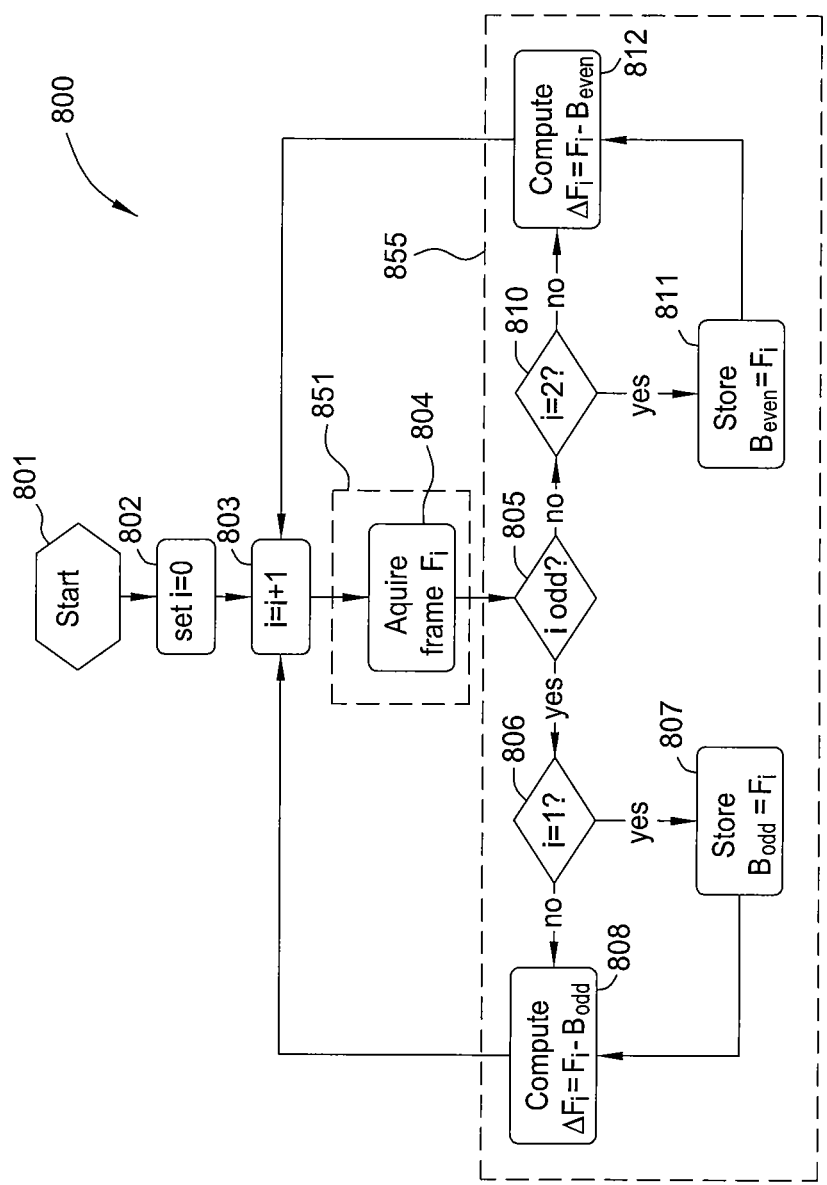
FIG. 8 is a flow diagram of one embodiment of a method for sensing an input object relative to a sensing region according to one or more of the embodiments described herein.

FIG. 8 illustrates a method 800 for sensing an input object relative to the sensing region 120, where the substantially non-random interference has a frame rate ratio of 2, as previously shown in FIG. 5. The method 800 starts by first resetting and indexing the counter "i" (i.e., steps 801-803) so that the first sensing image (i.e, frame $F_i$, where i=1), which is synchronized with the substantially non-random interference, can then be acquired at step 804 by a sensor module 851. The sensor module 851 is generally found within the processing system 110 of the input device 100, and is used transmit transmitter signals and receiver resulting signals to generate the sensing image. In one embodiment, the sensor module may perform various calculations to minimize the computational load on the determination module 855. In general, the sensor module 851 is adapted to acquire the sensing image and the determination module 855 is adapted to determine the positional information of an input object and manage the baseline images (e.g., correct for drift in the sensing element data). One will note that the acquired sensing images, or frames $F_i$, comprise a matrix of data acquired from each the sensing elements 121 in the sensing region 120 of the input device 100. Next, during step 805, the determination module 855 in the processing system 110 determines whether the acquired frame $F_1$ is an odd or even frame. Therefore, since frame $F_1$ is an odd frame, the method 800 proceeds to step 806, where the processing system then determines whether frame $F_1$ is the first odd frame in a sequence of acquired sensing images. Since frame $F_1$ is the first sensing image the method 800 proceeds to step 807, where the acquired frame $F_1$ is then stored in memory in the input device 100 as the odd baseline image $B_{odd}$, which is also in this case baseline image $B_1$. Next, at step 808, the touch determination image, or delta image $\Delta F_1$, is then formed by calculating the difference between the stored baseline image $B_{odd}$ from the currently received frame $F_i$, which in this case is frame $F_1$. The cycle then repeats by indexing the counter "i" by one and a second sensing image, of frame $F_2$ is acquired by performing steps 803-804 again. Next, during step 805, the sensor module 851 in the processing system determines whether the acquired frame $F_2$ is an odd or even frame. Therefore, since frame $F_2$ is an even frame, the process proceeds to step 810, where the processing system then determines whether frame $F_2$ is the first even frame in a sequence of acquired sensing images. Since frame $F_2$ is the first even sensing image the process proceeds to step 811, where the acquired frame $F_2$ is then stored in memory in the input device 100 as the even baseline image $B_{even}$, which is also in this case baseline image $B_2$. Next, at step 812, the touch determination image, or delta image $\Delta F_2$, is then formed by calculating the difference between the stored baseline image $B_{even}$, and the currently received frame $F_i$, which in this case is frame $F_2$. The cycle then repeats by indexing the counter "i" by one and a third sensing image, of frame $F_3$ is acquired by performing steps 803-804 again. Next, during step 805, the sensor module 851 in the processing system 110 determines whether the acquired frame $F_3$ is an odd or even frame. Therefore, since frame $F_3$ is an odd frame the method 800 proceeds to step 806, where the processing system then determines whether frame $F_3$ is the first odd frame in a sequence of acquired sensing images. Since frame $F_3$ is not the first sensing image the process proceeds to step 808, where the delta image $\Delta F_3$, is then formed by calculating the difference between the stored baseline image $B_{odd}$ from the currently received frame $F_3$. The process then proceeds following the cycle of steps as discussed above for each of the subsequently acquired frames $F_i$, wherein each of the subsequently acquired frames $F_i$ are each compared with the correct baseline image depending on whether it is odd or even.

While FIG. 8 illustrates a configuration where the sensing module 851 performs step 804 and the determination module 855 performs steps 805-812 this configuration is not intended to limiting as to the scope of the invention described herein, since the sensor module 851 may perform one or more of the steps performed by the determination module 855 and vice versa. In one example, to reduce the number of steps that the determination module 855 completes, the sensor module is configured to perform steps 805-807 and 810-811.

Figure 9:
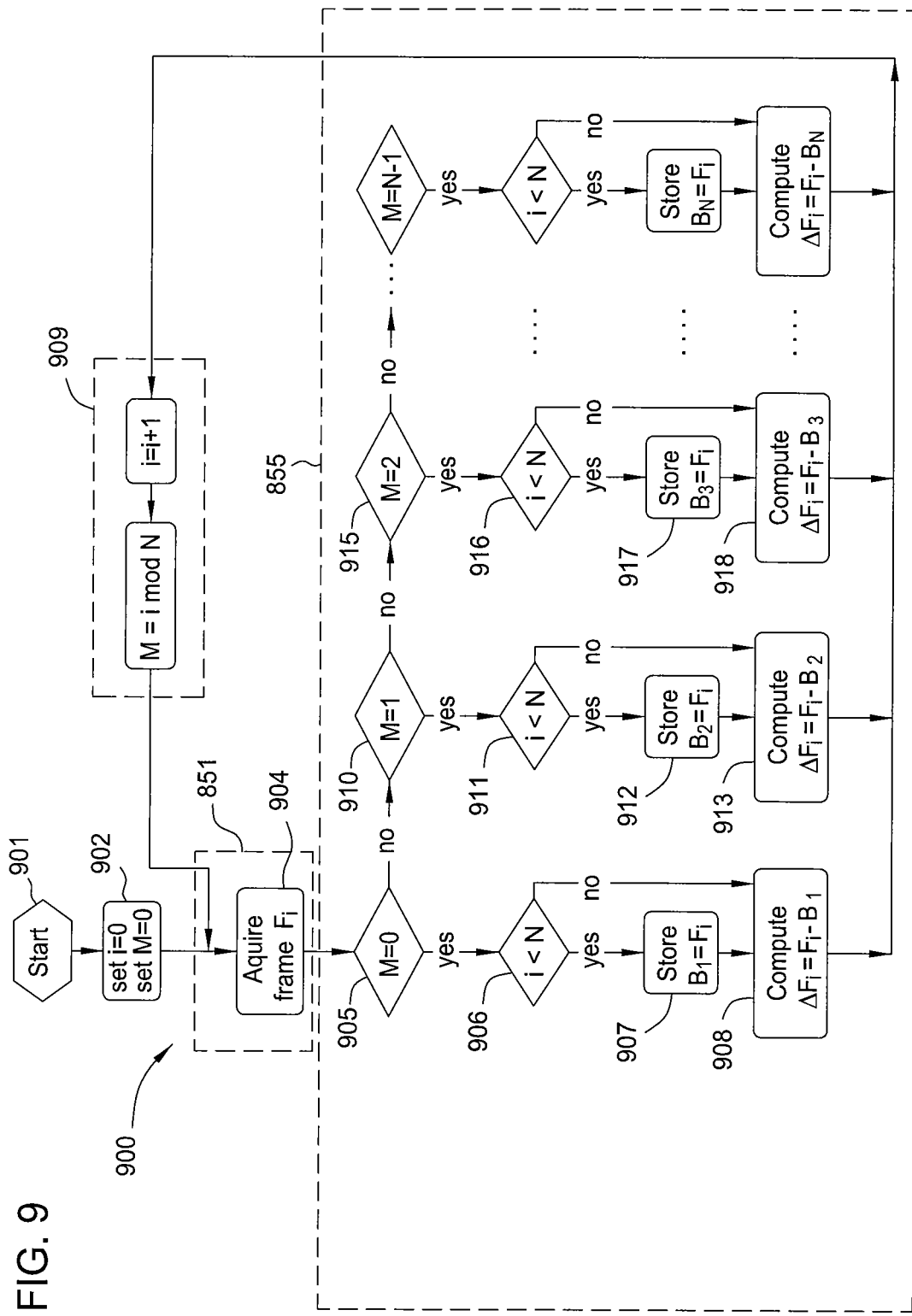
FIG. 9 is a flow diagram of one embodiment of a method for sensing an input object relative to a sensing region, according to one or more of the embodiments described herein.

FIG. 9 illustrates a method 900, which is similar to method 800, but is used to for sensing an input object, where the interaction of the substantially non-random interference and the collection of the sensing images creates more than two frame types. One will note that the variable labeled N, which is the lowest common multiple of the frame rate ratio (e.g., LCM(S,R)), in this figure is equal to the number of different frame types that are created by the interaction of the substantially non-random interference and the collection of the sensing images, and the variable labeled "M" is an integer that is used to keep track of the frames in the baseline collection steps in the method 900, and varies from zero to N−1 (i.e., M=i mod N). In the non-limiting example illustrated in FIG. 9, the variable N happens to be greater than three, however, one will note that in general N can be an integer that is greater than or equal to two. The method 900 starts by first resetting and indexing the counters "i" and "M" (i.e., steps 901-902), so that the first sensing image (i.e, frame $F_1$), which is synchronized with the substantially non-random interference, can then be acquired at step 904 by the sensor module 851. In one example, the process of synchronizing the components that are controlling the generation of the substantially non-random interference and the components that are controlling the creation of the sensing images may include sending synchronization communications between these various components at least every N collected sensing images. Next, during step 905, the determination module 855 in the processing system determines whether the acquired frame $F_1$ is of the first frame type (e.g., determine if M=0, which in this case it is true since the initial value of M is set to zero). Therefore, since frame $F_1$ is of a first frame type, the process proceeds to step 906, where the processing system then determines if "i" is less than N, which is true in this case. The method 900 then proceeds to step 907, where the acquired frame $F_1$ is then stored in memory in the input device 100 as the first baseline image $B_1$. Next, at step 908, the touch determination image, or delta image $\Delta F_i$, is then formed by calculating the difference between the stored baseline image $B_1$ and the currently received frame $F_i$, which in this case is frame $F_1$. The cycle then repeats, and the new values of M and i are calculated by incrementing the index "i" by one and then by calculating the remainder of the integer division (e.g., M=i mod N), which for the second cycle would set M equal to 1 (e.g., the remainder of the integer division where i=1 is equal to one (e.g., remainder of 1/N=1)). In one example, the method of obtaining the correct baseline image for each frame type is completed for the first N cycles of acquired sensing images (e.g., see the $N^{th}$ cycle 930), and then the baseline determination steps 907, 912, 917, etc. need not be performed until the processing system 110 determines that one or more of the baseline images need to be updated. Therefore, the acquired sensing images $F_i$ that are greater than the number of frame types N will be each be compared with the desired baseline $B_k$ of the same type to form the delta $\Delta F_i$ to determine the presence of an input object. The method 900 then proceeds following the cycle of steps as discussed above for each of the subsequently acquired frames $F_i$, wherein each of the subsequently acquired frames $F_{i-k}$ are each compared with the proper baseline image $B_k$ depending on it's frame type to determine the desired delta image $\Delta F_i$ that is used to detect the presence or positional information of an input object. In some embodiments of the method 900, it may be desirable during the early part of the process sequence to determine the baseline images $B_k$ by performing one or more of the steps 907, 912, 917, etc. and then proceeding to step 909, without performing the formation of the delta image $\Delta F_i$ step.

Nominal Image Correction Method

Figure 10:
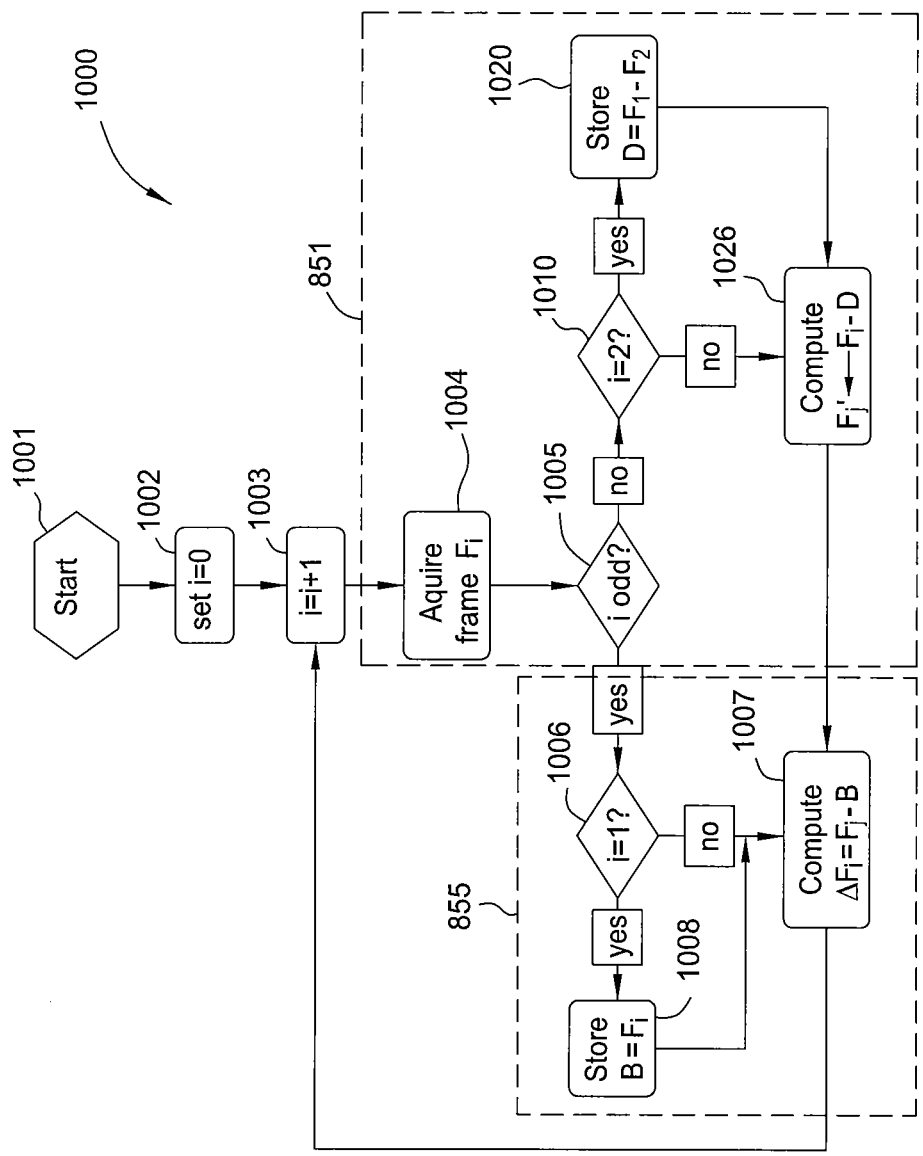
FIG. 10 is a flow diagram of one embodiment of a method for sensing an input object relative to a sensing region, according to one or more of the embodiments described herein.

One system and method of resolving the differences created by the effect of substantially non-random interference on different sensing image frames is to actively correct, or normalize, each acquired sensing image to make them all appear to have the same sensing image characteristics as a "nominal sensing image." In this case the processing system 110 is used to correct for the differences found in the various different frame types by adjusting the acquired sensing images of the different frame types to match a desired frame type, or "nominal frame type." By way of example, referring to FIG. 10, which includes a system that has two frame types, the processing system is used to form a differential image "$D_i$", which is the difference between the nominal image (e.g., "odd" images) and an image of another frame type (e.g., even images), and then forming a corrected image, or normalized image, for each subsequent sensing image of the other frame type (e.g., even images) to make them similar to the nominal frame type (e.g., "odd" images). The nominal image, or nominal frame type, need not be of a measured frame type (e.g., odd frame type), but may be some composite frame type that is different from all of the acquired frame types, which is discussed further below. As noted above, to reliably control or manage the process of determining an input object's positional information, the substantially non-random interference (e.g., display update interference) and sensing image collection processes need to be synchronized. The process of synchronizing the substantially non-random interference may include sending periodic communications between the components that are controlling the generation of the interference (e.g., display module) and the components that are controlling the creation of the sensing images (e.g., sensor module 851).

Therefore, in some embodiments of the invention, a differential image $D_i$ is formed for each of the different frame types and is used to make them all look like the nominal frame type. In one example, in a system that has three different frame types, it may be desirable to correct, or normalize, the second and third frame types to match the first frame type by correcting the differences between the second and third frame types relative to the first frame type (e.g., nominal frame type). Mathematically, this could be expressed as:

$$D_i = F_i - F_j \quad (4), \text{ and}$$

$$F_i' = F_i - D_i \quad (5),$$

where in equation (4) the $F_j$ is the nominal frame type and $F_i$ are the sensing images for the other frame types. In equation (5), the normalized image, or corrected image $F_i'$ is formed by subtracting the differential image $D_i$ from the un-normalized, or uncorrected sensing image $F_i$ of the different image type. In one example, as discussed above for the three frame type configuration, the equations could be expressed as:

$$D_2 = F_2 - F_1 \quad (6a),$$

$$D_3 = F_3 - F_1 \quad (6b),$$

and $$F_1' = F_i \text{ for } i=1, 4, 7, \quad (7a),$$

$$F_1' = F_i - D_2, \text{ for } i=2, 5, 8, \quad (7b),$$

$$F_1' = F_i - D_3, \text{ for } i=3, 6, 9, \quad (7c),$$

where in equations 6a-6b, the $F_1$ is the nominal frame type (e.g., j=1), and $F_2$ and $F_3$ correspond to the other frame types, which in our example above would be frame types two and three (e.g., i=2 or 3). Referring to equations 7b-7c, the normalized image, or corrected image $F_1'$ is formed by subtracting the differential image $D_i$ from the un-normalized, or uncorrected sensing image $F_i$ of the different image type. The corrected, or normalized, image can then be compared with a baseline image "B", which is of the nominal image type, to determine if an input object is present over the sensing region 120. Mathematically, this can be expressed as:

$$\Delta F_i = F_i' - B \quad (8),$$

where in equation (8) the $F_j$ is the nominal frame type, "B" is the baseline image of the nominal frame type and $F_i'$ is the corrected image. Thus, frames $F_j$ that are of the nominal frame type (e.g., j=1) can be directly used to determine the presence of an input object by comparing each acquired sensing image with the stored "baseline image "B", as shown in the first part of equation (8). One will note that all of acquired frames $F_i$ of the other frame types (e.g., i=2 or 3) need to be normalized, or corrected, so that the generated interference is eliminated and they generally match the nominal frame type. One will note that "$D_i$" comprises a matrix of data that is determined by subtracting the difference between the data acquired by each sensing element during the collection of data for each of the different frame types, and the acquired sensing images and baseline images each comprise matrices of data acquired from each the sensing elements 121 in the sensing region 120 of the input device 100.

In various embodiments, forming a differential image $D_i$ and then correcting, or normalizing, all of the acquired sensing images of the non-nominal frame types to match a nominal frame type has various computational and performance advantages. Some of these advantages include: 1) the simplification of the process of determining an input object positional information, since only a single type of sensing image (e.g., nominalized image $F_i'$) is sent to the image processing part of the processing system; 2) the management of multiple baseline images is not required, since only one baseline image is needed; 3) it is easier to correct a single baseline that has become corrupted versus correcting multiple baselines; and 4) the fact that the code used control the detection of the input object does not need to change due to the configuration of the sensor electrodes in the input module. This process is also advantageous, since the differential images $D_i$ are insensitive to the presence of a static input object that is disposed in the input region 120 when the sensing images used to form the differential image $D_i$ are formed, which is an issue that will corrupt a baseline image and affect the detection of an input object. To prevent a moving finger from corrupting the formation of the deferential image $D_i$, one can use a simple motion detector (e.g., absolute sensing, a separate proximity sensor, course transcapacitive sensing, or the like) or series of acquired sensing images that will be used to exclude these frames from the formation of the deferential image $D_i$. In one example, at least three sequential image frames are acquired in a two frame type system (shown in FIG. 5), and then the first and third frames are compared to see if they differ significantly, and thus a motion would be detected. If a motion is detected then these frames are discarded, new sensing images are acquired, and the process is then repeated.

Moreover, since the same sensor elements are used to determine the sensing images of each of the different frame types, any drift in the measurements made by the sensing elements will generally not affect the formed differential image $D_i$, as compared to the comparison of a sensing image formed at one time to a baseline image B that was formed before the drift occurred in the measurements. Thus, corrections that may be needed to the differential image $D_i$, due such things as environmental changes, can be easily corrected by use of simple computations made by the data acquisition components in the processing system, such as the sensor module, versus the often busier image processing module(s) in the processing system.

FIG. 10 illustrates a method 1000 for sensing an input object relative to the sensing region 120, where the substantially non-random interference has a frame rate ratio of 2, as previously shown in FIG. 5. The method 1000 starts by first resetting and indexing the counter "i" (i.e., steps 1001-1003) so that the first sensing image (i.e, frame $F_i$, where i=1), which is synchronized with the substantially non-random interference, can then be acquired at step 1004 by the sensor module 851, which is discussed above. One will note that the acquired sensing images, or frames $F_i$, comprise a matrix of data acquired from each the sensing elements 121 in the sensing region 120 of the input device 100 (or in the case of absolute sensing, one or more vectors of acquired data). Next, during step 1005, the sensing module 851 in the processing system 110 determines whether the acquired frame $F_1$ is an odd or even frame. Therefore, since frame $F_1$ is an odd frame, the method 1000 proceeds to step 1006, where the determination module 855 in the processing system 110 then determines whether frame $F_1$ is the first odd frame in a sequence of acquired sensing images. Since frame $F_1$ is the first sensing image the process proceeds to step 1008, where the acquired frame $F_1$ is then stored in memory in the input device 100 as the odd baseline image $B_{odd}$, which is also in this case baseline image B. Next, at step 1007, the touch determination image, or delta image $\Delta F_i$, is then formed by calculating the difference between the stored baseline image "B" from the currently received frame $F_1$. The cycle then repeats by indexing the counter "i" by one and a second sensing image, or frame $F_2$, is acquired by performing steps 1003-1004 again. Next, during step 1005, the sensor module 851 in the processing system determines whether the acquired frame $F_2$ is an odd or even frame. Therefore, since frame $F_2$ is an even frame the process proceeds to step 1010, where the processing system then determines whether frame $F_2$ is the first even frame in a sequence of acquired sensing images. Since frame $F_2$ is the first even sensing image the process proceeds to step 1020, where the acquired frame $F_2$ is then subtracted from the first frame $F_1$ of the first frame type (i.e., "odd" frame type and in this case the nominal frame type) to form a differential image $D_i$ that is then stored in memory in the input device 100. Next, at step 1026, a normalized sensing image, or corrected sensing image $F'_i$ is formed by subtracting the formed differential image $D_1$ from the current acquired frame $F_2$. Then, in step 1007, the $B_{odd}$, or "B" baseline image is subtracted from the corrected sensing image $F_i'$ to form the touch determination image, or delta image $\Delta F_2$. The cycle then repeats by indexing the counter "i" by one and a third sensing image, of frame $F_3$, is acquired by performing steps 1003-1004 again. Next, during step 1005, the processing system determines whether the acquired frame $F_3$ is an odd or even frame. Therefore, since frame $F_3$ is an odd frame the process proceeds to step 1006, where the processing system 110 then determines whether frame $F_3$ is the first odd frame in a sequence of acquired sensing images. Since frame $F_3$ is not the first sensing image, the method 1000 proceeds to step 1007, where the delta image $\Delta F_3$, is then formed by calculating the difference between the stored baseline image $B_{odd}$ from the currently received frame $F_3$, which is of the first frame type ("odd" frame). The method 1000 then proceeds following the cycle of steps as discussed above for each of the subsequently acquired frames $F_i$. In this case, each of the subsequently acquired "even" frames $F_i$, where i=2, 4, 6, etc., are normalized or corrected by subtracting the previously formed differential image $D_i$ with the current acquired even image to form the corrected sensing image $F_i'$, which can then be used to determine the positional information of an input object by comparing it with the stored "odd" baseline image B. Each of the subsequently acquired "odd" frames $F_i$, where i=1, 3, 5, etc., can be directly used to determine the presence of an input object by comparing it with the stored baseline image B.

While FIG. 10 illustrates a configuration where the sensing module 851 performs step 1004-1005, 1010 and 1020-1026, and the determination module 855 performs steps 1006-1008 this configuration is not intended to limiting as to the scope of the invention described herein, since sensor module 851 may perform one or more of the steps performed by the determination module 855 and vice versa. In one example, to reduce the number of processing steps that the determination module 855 completes the sensor module is configured to perform steps 1004-1006, 1008, 1010 and 1020-1026.

Figure 11:
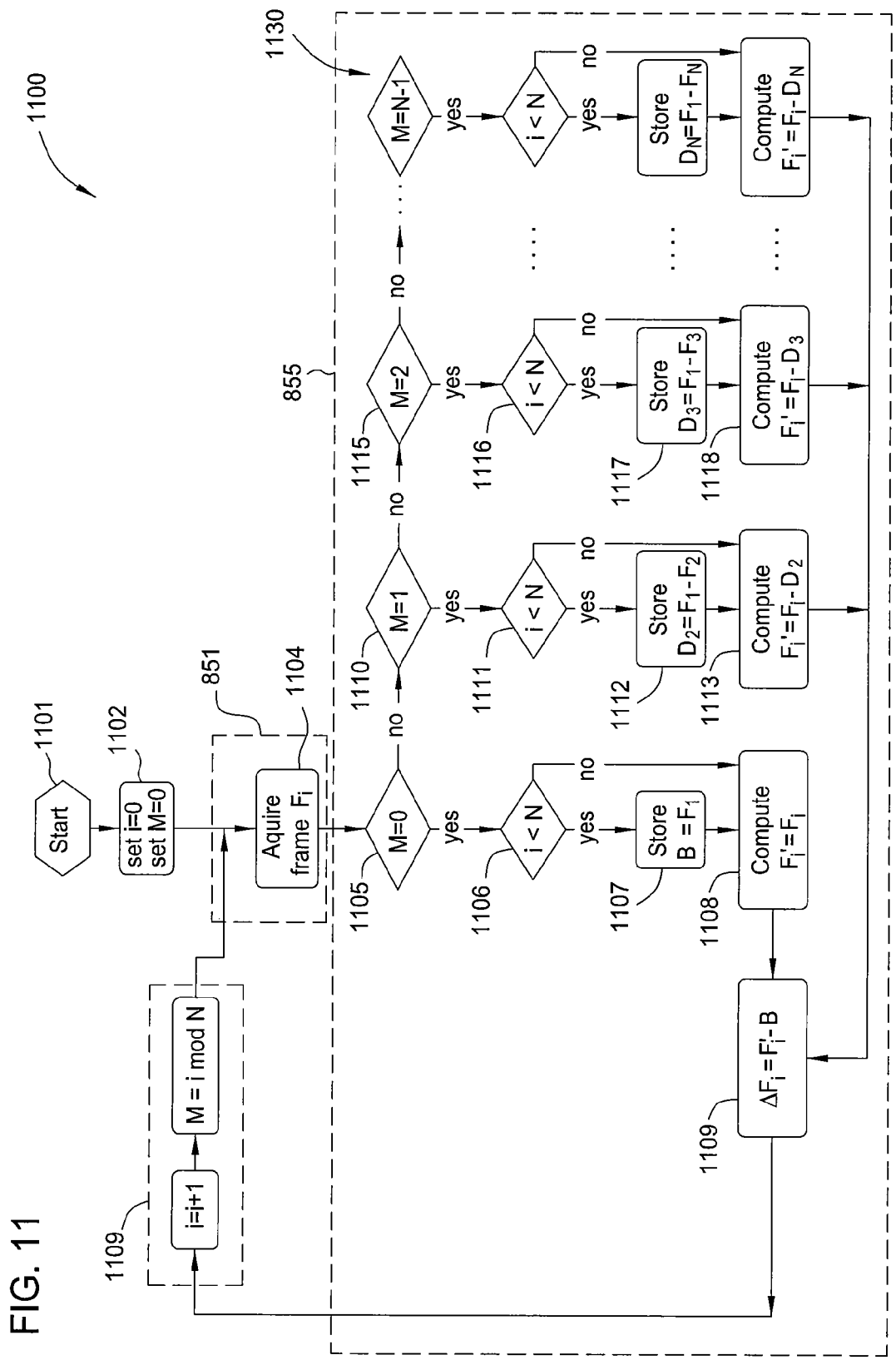
FIG. 11 is a flow diagram of one embodiment of a method for sensing an input object relative to a sensing region, according to one or more of the embodiments described herein.

FIG. 11 illustrates a method 1100, which is similar to method 1000, but is used for sensing the presence of an input object, where the interaction of the substantially non-random interference and the collection of the sensing images creates more than two frame types. One will note, as discussed above, that the variable labeled "N" is equal to the number of different frame types and the variable labeled "M" is an integer that is used to keep track of the frames in the baseline collection steps in the process sequence, and varies from zero to N−1 (i.e., M=i mod N), which in this case is used to keep track of the frames in the differential image $D_i$ determination steps in the process sequence. In the non-limiting example illustrated in FIG. 11, the variable N happens to be greater than three (i.e., N>3), however, one will note that in general, N can be an integer that is greater than or equal to two. While method 1100 is used to normalize or correct all of the acquired sensing image data that is not of the first frame type, to match the first frame type, this configuration is not intended to be limiting as to the scope of the invention described herein, since the method can also be used to match some other nominal frame type (e.g., frame type 2, 3, etc. or some intermediate frame type).

In one example, the method 1100 starts by first resetting and indexing the counters "i" and "M" (i.e., steps 1101-1102) so that the first sensing image (i.e, frame $F_1$), which is synchronized with the substantially non-random interference, can then be acquired at step 1104 by the sensor module 851. In one example, the process of synchronizing the components that are controlling the generation of the substantially non-random interference and the components that are controlling the creation of the sensing images may include sending synchronization communications between these various components at least every N collected sensing images. Next, during step 1105, the determination module 855 in the processing system determines whether the acquired frame $F_1$ is of the first frame type by determining if M=0, which in this case is true, since the M was set initially to equal zero. Therefore, since frame $F_1$ is of a first frame type the method 1100 proceeds to step 1106, where the processing system 110 then determines if "i" is less than N, which in this case is true. The method 1100 then proceeds to step 1107, where the acquired frame $F_1$ is then stored in memory in the input device 100 as the baseline image "B." Next, at step 1108, the normalized or corrected sensing image $F_i'$ is then formed by setting the corrected sensing image $F_1'$ equal to the frame $F_1$, which in this case is $F_1$. Next, at step 1109, the touch determination image, or delta image $\Delta F_i$, is then formed by calculating the difference between the stored baseline image B and the currently received frame $F_1$, which in this case is frame $F_1$. The cycle then repeats, and the new values of M and i are calculated by incrementing the index "i" by one and then by calculating the remainder of the integer division (e.g., M=i mod N) (see step 1120). In one example, the process of obtaining the proper differential image $D_i$ for each subsequent frame type is completed for the first "N" cycles (e.g., see the $N^{th}$ cycle 1130) and then the differential image determination steps 1112, 1117, etc. need not be performed, unless the stored differential image $D_i$ data for each frame type for some reason needs to be updated. Therefore, the acquired sensing images $F_i$ of the non-nominal frame type that are greater than the number of frame types "N" in the collection sequence are compared with the desired differential image $D_i$ of the same frame type to form a normalized or corrected sensing image $F_i'$, and then a delta image $\Delta F_i$, is then formed by calculating the difference between the stored baseline image B and the corrected sensing image $F'_i$. Each of the subsequently acquired frames $F_i$ that are of the nominal frame type, which in this example is the first frame type (e.g., i=0, N, 2N, etc.), can be directly used (e.g., $F_i'=F_i$) to determine the presence of an input object by comparing it with the stored baseline image. In some embodiments of the method 1100, it may be desirable to determine either the baseline image B and/or each of the various differential images $D_i$ by performing one or more of the steps 1107, 1112, 1117, etc. and then proceeding to step 1120, without performing the formation of the delta image $\Delta F_i$ step (e.g., step 1109) or even forming the corrected sensing image steps 1108, 1113, 1118, etc.

In one example, the method 1100 may comprise acquiring a plurality of sequentially formed sensing images from an array of sensor electrodes disposed in a sensing region of an input device, wherein every N sequentially formed sensing images are different from each other, where N is equal to or greater than two, and every N+1 sequentially formed sensing images are substantially similar to each other, determining a sensing baseline image based on a first sensing image, determining a first sensor differential image by subtracting the first sensing image from a second sensing image, subtracting the determined first sensor differential image from every sequentially formed sensor image that is a P times N from the second sensing image, where P is an integer that varies from 1 to Z, to form a set of Z normalized sensing images, and determining the position of an object over the array of sensing elements by subtracting the sensing baseline image from one of the normalized sensing images in the set of Z normalized sensing images.

In an alternate embodiment, the processing system can be used to correct for the differences found in the different frame types by adjusting the baseline image of a nominal frame type to match the frame type of the other non-nominal frame types, so that each of these adjusted baseline images for each non-nominal frame type can be used to determine the presence of an input object. In this case, a differential image $D_i$ is formed for each of the different frame types, as discussed above. Next, the processing system 110 then forms a corrected baseline image $B_i'$ for each of the non-nominal frame types. The corrected baseline images are formed by subtracting the formed differential images $D_i$ for each of the non-nominal frame types from the stored baseline image of the nominal frame type, and then store these baseline images in memory. Mathematically, this could be expressed as:

$$D_i = F_i - F_j \quad (9), \text{ and}$$

$$B_i' = B_j - D_i \quad (10),$$

where in equation (9) the $F_j$ is the nominal frame type and $F_i$ are frames of the other non-nominal frame types. If j corresponds to the nominal frame type then $B_i'=B_j$. Referring to equation (10), the corrected image $B_i'$ is formed by subtracting the differential image $D_i$ from the nominal image's baseline image $B_j$ for frames j that are not of the nominal frame type. The corrected baseline images $B_i'$ can then be used to determine if an input object 140 is present over the sensing region 120 using the acquired sensing images of the non-nominal frame types. Mathematically, this can be expressed as:

$$\Delta F_i = F_i - B_i' \quad (11),$$

where in equation (11) the $F_i$ are acquired frames, $B_i'$ are the corrected baseline images. Thus, frames $F_j$ that are of the nominal frame type can be directly used to determine the presence of an input object by comparing each acquired sensing image with the stored baseline image, "$B_i$", while frames $F_i$ of the other non-nominal frame types can be used with a corrected baseline image that has been adjusted for the generated EMI interference, and stored in memory, to determine the positional information of the input object. In this configuration, the differential image $D_i$ and the nominal image's baseline image $B_j$ can be updated and/or "relaxed" at different times or at different rates to provide an improved corrected baseline $B_i'$ at any time during the processing sequence.

In yet another embodiment, it may be desirable to select a nominal image, or nominal frame type, that does not coincide with a measured frame type (e.g., odd or even frame type), but choose a nominal frame type that is a composite frame type that is different from all of the normally acquired frame types. In this case, one can select a nominal frame type that is part way between two frame types used to form the differential image $D_i$ by dividing the differential image by a desirable constant "Q". Mathematically, this could be expressed as:

$$F_c' = F_i - D_i/Q \quad (12), \text{ and}$$

$$F_c' = F_h + D_i(1-(1/Q)) \quad (13),$$

where in equation (12) the normalized or corrected image $F_c'$ is formed by either subtracting or adding a differential image $D_i$ (from equation (4) above) that is divided by the constant "Q" from each un-normalized or uncorrected sensing images $F_i$ and $F_h$, respectively. The corrected images can then be compared with a corrected baseline image "$B_c$", which is equal to the sensing image $F_i$ minus $D_i$ divided by the constant Q (i.e., $B_c=F_i-D_i/Q$), so the presence of an input object can be determined. Mathematically, this can be expressed as:

$$\Delta F_i = F_c' - B_c \quad (14).$$

Thus, in this case, each of the formed sensing images of each of the different frame types will need to be corrected so that the same nominal baseline image can be used to form the delta image $\Delta F_i$. In one example, for a process that has two frame types, it may be useful to set the constant Q to two. Therefore, in this example, equations (4), (12) and (13) can be rewritten as:

$$D_i = F_2 - F_1 \quad (15)$$

$$F_c' = F_i - D_i/2 \text{ if i is odd, or} \quad (16a)$$

$$F_c' = F_i + D_i/2 \text{ if i is even, or} \quad (16a)$$

Therefore, the subsequently formed delta image $\Delta F_i$ (from equation 14) will be a composite of the odd and even frame types, and is determined by the subtraction of the corrected baseline image $B_c$ from the corrected images $F_c'$ for each acquired sensing image.

Baseline Image Correction Techniques

In all of the various embodiments described above, it is generally desirable to acquire and replace baseline images (e.g., $B_i$, $B_c$, $B_j$, $B_{odd}$, $B_{even}$) that have become corrupted, or that are not believed to be representative of the current baseline image. In some embodiments, baseline images are retaken periodically to accommodate for environmental changes (e.g., such as the effects of temperature drift or shock), to remove errors caused by the existing baseline image (e.g., false positives or negatives in detecting input in the sensing region), and the like. In addition, or in place of, retaking baseline images, some embodiments adjust the baseline images methodically over time. This adjustment (sometimes called "relaxation") is often configured to be fast enough to track environment changes, but not so fast as for it to substantially remove the effects of an input object that is in the sensing region. It is desirable, when updating a baseline image, to assure that no input objects are disposed within the sensing region 120, and similarly this may also be taken into account when making the "relaxation" adjustments. Some, or all, of the baseline images disclosed herein may be stored and/or used as differences between the baseline images of the different frame types instead of the full baseline images.

In configurations where multiple baseline images are actively used to correct for the presence of substantially non-random interference, each of the stored baseline images may be adjusted separately, and/or adjusted by the same or different amounts. For example, multiple baseline images may be retaken or adjusted during the same or different time periods and/or relaxed according to the same or different guidelines.

While the discussion above primarily discusses determining the baseline image at the start of a serial process of collecting many sensing images, this configuration is not intended to be limiting as to the scope of the invention described herein. In some embodiments, the baseline images may be acquired at another time during the series of collecting sensing images, which may include times other than at the start of a sensing process. However, in some embodiments the baseline images are formed at startup and/or upon wake-up of the input device 100. Most embodiments are configured to acquire baseline images at a time when there are no input objects in the sensing region, or at least when there are no input object in the sensing region that move fast enough as to cause differences in the one or more baseline images. This is the case whether full baseline images are stored, or if only differences between the baseline images are stored.

Some embodiments reject potential baseline images if they are determined to include input objects or moving input objects. The determination may be accomplished in any appropriate way. For example, some embodiments capture multiple capacitive images of the same frame type in quick succession, and evaluate if these sensing images differ beyond particular allowable amounts. If these collected sensing images do not vary beyond an allowable amount, then one of the sensing images, or some type of average of some or all of these sensing images, is kept as the baseline image.

Thus, the embodiments and examples set forth herein were presented in order to best explain the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the present technology to the precise form disclosed.

The invention claimed is:

1. A processing system for an input device, comprising:
a sensor module comprising sensor circuitry, the sensor module coupled with a plurality of sensor electrodes, and configured to:
acquire a plurality of sensing frames comprising a first sensing frame of a first frame type, a second sensing frame of a second frame type different than the first frame type, and a third sensing frame of the second frame type,
form a first differential frame relating the first and second frame types based on a comparison of the first sensing frame with the second sensing frame, and
form a first normalized frame of the first frame type based on a comparison of the first differential frame with the third sensing frame; and
a determination module configured to compare the first normalized frame with a baseline frame.

2. The processing system of claim 1, wherein the determination module is further configured to determine positional information of an input object in a sensing region of the input device based on the comparison of the first normalized frame with the baseline frame.

3. The processing system of claim 1, wherein:
the plurality of sensing frames further comprises a fourth sensing frame of a third frame type different than the first and second frame types, and a fifth sensing frame of the third frame type,
the sensor module is further configured to form a second differential frame relating the first and third frame types based on a comparison of the first sensing frame with the fourth sensing frame, form a second normalized frame of the first frame type based on a comparison of the second differential frame with the fifth sensing frame, and
the determination module is further configured to compare the second normalized frame and the baseline frame.

4. The processing system of claim 1, wherein the comparison of the first sensing frame and the second sensing frame used to form the first differential frame further comprises subtracting the second sensing frame from the first sensing frame.

5. The processing system of claim 1, wherein the comparison of the first sensing frame and the second sensing frame used to form the first differential frame further comprises subtracting the second sensing frame from the first sensing frame and dividing the difference by a first constant.

6. The processing system of claim 1, wherein the plurality of sensor electrodes are configured for capacitive sensing.

7. The processing system of claim 1, wherein the plurality of sensor electrodes comprise a plurality of common electrodes, and wherein at least one of the plurality of common electrodes is configured for both capacitive sensing and updating a display device.

8. The processing system of claim 7, wherein the sensor module is further configured to acquire the plurality of sensing frames at a first frame rate, and
wherein the processing system further comprises a display module coupled with the plurality of common electrodes, and wherein the display module is configured to update the display device at a second frame rate, wherein the first frame rate is greater than the second frame rate.

9. The processing system of claim 1, wherein the first frame type and the second frame type correspond to different portions of a display update cycle.

10. The processing system of claim 1, wherein the difference between the first frame type and the second frame type corresponds to different types of substantially non-random interference.

11. An input device, comprising:
a plurality of sensor electrodes configured to sense input objects in a sensing region of the input device; and
a processing system coupled with the plurality of sensor electrodes, and configured to:
acquire a plurality of sensing frames comprising a first sensing frame of a first frame type, a second sensing frame of a second frame type different than the first type, and a third sensing frame of the second frame type,
form a first differential frame relating the first and second frame types based on a comparison of the first sensing frame with the second sensing frame, and
form a first normalized frame of the first frame type based on a comparison of the third sensing frame with the first differential frame, and
compare the first normalized frame with a baseline frame.

12. The input device of claim 11, wherein the processing system is further configured to determine the positional information of an input object in the sensing region of the input device based on the comparison of the first normalized frame with the baseline frame.

13. The input device of claim 11, wherein:
the plurality of sensing frames further comprises a fourth sensing frame of a third frame type different than the first and second frame types, and a fifth sensing frame of the third frame type, and
the processing system is further configured to form a second differential frame relating the first and third frame types based on a comparison of the first sensing frame with the fourth sensing frame, form a second normalized frame of the first frame type based on a comparison of the second differential frame with the fifth sensing frame, and compare the second normalized frame with the baseline frame.

14. The input device of claim 11, wherein the plurality of sensor electrodes comprise a plurality of common electrodes, and wherein at least one of the plurality of common electrodes is configured for both capacitive sensing and updating a display device,
wherein the processing system is further configured to acquire the plurality of sensing frames at a first frame rate, and
wherein the processing system further comprises a display module coupled to the plurality of common electrodes, and wherein the display module is configured to update the display device at a second frame rate, wherein the first frame rate is greater than the second frame rate.

15. The input device of claim 11, wherein the first frame type and the second frame type correspond to different portions of a display update cycle.

16. A method of sensing an input object in a sensing region of an input device, comprising:
acquiring a plurality of sensing frames with a plurality of sensor electrodes disposed in a sensing region of an input device, the plurality of sensing frames comprising a first sensing frame of a first frame type, a second sensing frame of a second frame type different than the first frame type, and a third sensing frame of the second frame type;
determining a first differential frame relating the first and second frame types based on a comparison of the first sensing frame with the second sensing frame;
determining a first normalized frame of the first frame type based on a comparison of the first differential frame with the third sensing frame; and
determining positional information of the input object in the sensing region of the input device based on a comparison of a baseline frame with the normalized sensing frame.

17. The method of claim 16, wherein the plurality of sensing frames further comprises fourth and fifth sensing frames of a third frame type different than the first and second frame types, the method further comprising:
determining a second differential frame relating the first and third frame types by comparing the first sensing frame with the fourth sensing frame; and
determining a second normalized frame of the first frame type based on a comparison of the second differential frame with the fifth sensing frame,
wherein the determining positional information of the input object in the sensing region is further based on the second normalized frame.

18. The method of claim 16, wherein the plurality of sensor electrodes comprise a plurality of common electrodes, the method further comprising:
transmitting a transmitter signal using at least a first of the plurality of common electrodes, wherein sensed effects of the transmitter signal are used to form at least a portion of at least one of the first and second sensing frames; and
transmitting a display update signal to update a display device using at least a second of the plurality of common electrodes, wherein the plurality of sensing frames are acquired at a first frame rate and the display device is updated at a second frame rate, wherein the first frame rate is greater than the second frame rate.

19. The method of claim 16, wherein the first frame type and the second frame type are formed during different portions of a cycle of a substantially non-random interference source to which the plurality of sensor electrodes are exposed.

20. The method of claim 16, wherein
the acquiring a plurality of sensing frames further comprises:
acquiring a plurality of sensing frames with the plurality of sensor electrodes, wherein every N sensing frames are different from each other, where N is greater than or equal to two, and every N+1 sensing frames are substantially similar to each other,
the determining the first normalized frame based on the comparison of the first differential frame and the third sensing frame of the plurality of sensing frames, further comprises:
determining a first sensor differential frame from each sensing frame that is P times N from the second sensing frame, where P is an integer that varies from 1 to Z, to form a set of Z normalized sensing frames, and
the determining the positional information of an input object further comprises:
determining the positional information of an input object based on a comparison of the baseline frame and the normalized sensing frames in the set of Z normalized sensing frames.

* * * * *